(12) United States Patent
Pogorelik et al.

(10) Patent No.: US 10,956,789 B2
(45) Date of Patent: Mar. 23, 2021

(54) SYSTEMS, METHODS, AND APPARATUS TO IMPROVE COMPUTING SYSTEM UTILIZATION

(71) Applicant: INTEL CORPORATION, Santa Clara, CA (US)

(72) Inventors: Oleg Pogorelik, Lapid (IL); Alexandra Manevitch, Jerusalem (IL); Raizy Kellerman, Jerusalem (IL)

(73) Assignee: INTEL CORPORATION, Santa Clara, CA (US)

( * ) Notice: Subject to any disclaimer, the term of this patent is extended or adjusted under 35 U.S.C. 154(b) by 43 days.

(21) Appl. No.: 16/368,562

(22) Filed: Mar. 28, 2019

(65) Prior Publication Data
US 2019/0220381 A1   Jul. 18, 2019

(51) Int. Cl.
| | | |
|---|---|---|
| *G06K 9/62* | (2006.01) | |
| *G06F 11/30* | (2006.01) | |
| *G06K 9/78* | (2006.01) | |
| *G06N 20/00* | (2019.01) | |

(52) U.S. Cl.
CPC ........ *G06K 9/6262* (2013.01); *G06F 11/3013* (2013.01); *G06F 11/3058* (2013.01); *G06F 11/3089* (2013.01); *G06K 9/6263* (2013.01); *G06K 9/78* (2013.01); *G06N 20/00* (2019.01); *G06K 2209/19* (2013.01)

(58) Field of Classification Search
CPC ...... G06K 9/2018; G06K 9/6262; G06K 9/78; G06K 9/6263; G06K 2209/19; G06F 11/3058; G06F 11/3013; G06F 11/3089; G06N 20/00
See application file for complete search history.

(56) References Cited

U.S. PATENT DOCUMENTS

| | | | |
|---|---|---|---|
| 2006/0100798 A1* | 5/2006 | Morman | G06F 11/24 702/57 |
| 2009/0089619 A1* | 4/2009 | Huang | H04L 12/66 714/37 |
| 2012/0079480 A1* | 3/2012 | Liu | G06F 11/3466 718/1 |
| 2018/0314826 A1* | 11/2018 | Mankovskii | G06N 20/00 |

OTHER PUBLICATIONS

Artificial Neural Network for Technical Diagnostics of Control Systems by Thermography (published in 2018 International Conference on Industrial Engineering, Applications and Manufacturing, May 2018).*

* cited by examiner

*Primary Examiner* — Casey L Kretzer
(74) *Attorney, Agent, or Firm* — Hanley, Flight & Zimmerman, LLC

(57) ABSTRACT

Methods, apparatus, systems, and articles of manufacture are disclosed to improve computing system utilization. An example system includes a visual recognition controller to determine whether an infrared image of the device corresponds to a first utilization state of the device based on a machine-learning model, and generate a report including the first utilization state, and at least one processor to execute one or more actions to adjust operation of the device from the first utilization state to a second utilization state based on the report obtained from the visual recognition controller, the second utilization state corresponding to reduced utilization compared to the first utilization state.

21 Claims, 11 Drawing Sheets

SYSTEMS, METHODS, AND APPARATUS TO IMPROVE COMPUTING SYSTEM UTILIZATION

FIELD OF THE DISCLOSURE

This disclosure relates generally to computer processor utilization and, more particularly, to systems, methods, and apparatus to improve computing system utilization.

BACKGROUND

Typical computing systems, such as Internet-of-things (IoT) devices, servers, etc., are developed to withstand high-utilization and processor overloading. To better understand utilization of computing resources of such devices, measuring system performance during runtime may be performed. However, the creation and execution of software tools to measure performance indicators typically mandates low-level changes in associated hardware and software, tight integration with the software tools, and may affect runtime execution.

Figure 1:
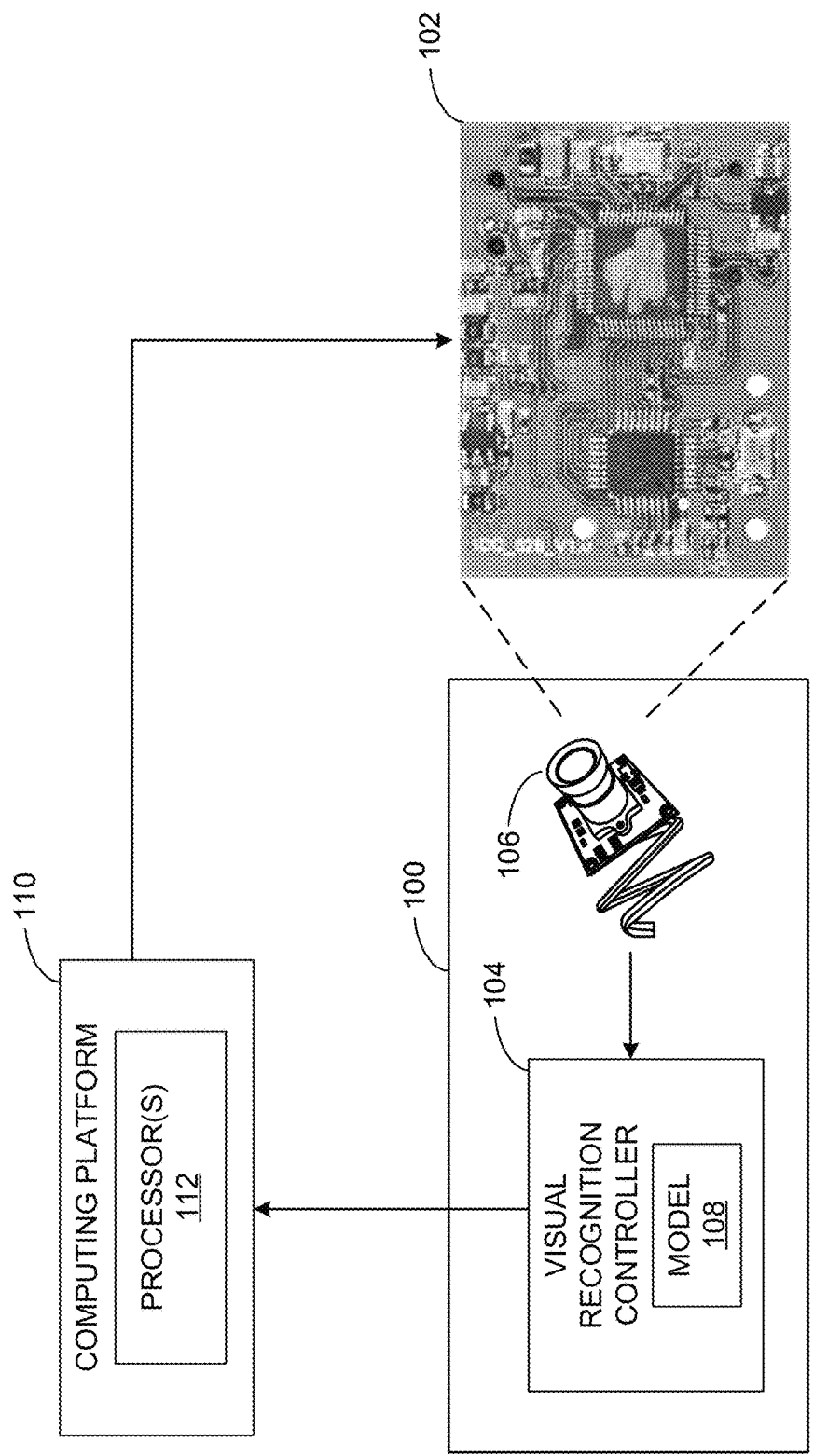
FIG. 1 is a schematic illustration of a first example visual recognition system monitoring an example device to provide run-time information of device utilization.

The figures are not to scale. In general, the same reference numbers will be used throughout the drawing(s) and accompanying written description to refer to the same or like parts. Connecting lines or connectors shown in the various figures presented are intended to represent example functional relationships and/or physical or logical couplings between the various elements.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Typical computing systems, such as Internet-of-things (IoT) devices, servers, etc., are developed to withstand high-utilization and processor overloading when executing computing tasks. Measuring performance of target hardware (e.g., a printed circuit board, a computing device, a computing system, etc.) during runtime is a challenging task. For instance, creation and processing of performance indicators usually mandates low-level changes in hardware and software associated with the target hardware. Accordingly, tight integration of the associated hardware and software with dedicated system performance and monitoring software tools can diminish runtime performance.

Some runtime performance monitoring techniques of target hardware include software profilers and run-time monitors. Such profilers and monitors require dedicated compilations by adding specific code to executable instructions executed by the target hardware that can increase complexity and impact runtime performance. Some runtime performance monitoring techniques of target hardware include physical sensor-based circuit breakers to open a circuit in response to one or more processors of the target hardware overheating. However, such circuit breakers provide an abrupt and crude response to an overloading condition, but neither provide detailed information about the cause of the overloading condition nor prevent the overloading condition.

Some runtime performance monitoring techniques of target hardware include embedding built-in performance indicators (e.g., key performance indicators (KPIs), such as performance monitoring units (PMUs)) in the target hardware. For instance, PMUs may correspond to hardware performance counters embedded in a computer processor to measure performance parameters of the computer processor. However, the embedding and utilization of the PMUs may bring additional load to the target hardware. The PMUs can cause additional development complexity. The PMUs mandate tight integration and a detailed level of understanding of the target hardware architecture. In some instances, when the target hardware is upgraded, the PMUs correspondingly need to be upgraded. Accordingly, the PMUs may add processor runtime overhead and introduce a significant memory footprint in order to execute.

Examples disclosed herein monitor and control target hardware performance as well as detect abnormal conditions of the target hardware during runtime. In some disclosed examples, an example visual recognition system measures performance of target hardware or a portion of the target hardware through visual recognition. The example visual recognition system can facilitate the visual recognition by capturing heat-signatures associated with the target hardware. In some disclosed examples, the visual recognition system can use one or more infrared cameras to capture the heat-signatures to provide runtime information about system utilization, report runtime anomalies, and generate reports and alerts when known states and/or critical conditions are identified.

In some disclosed examples, the visual recognition system can invoke logic circuitry, at least one processor, etc., to adjust an operation of the target hardware. The operation adjustment can improve system utilization and cause the target hardware to transition from (1) a first state corresponding to a critical operating condition and/or a condition in which a failure may occur to (2) a second state corresponding to a safe, normal, and/or otherwise typical operation of the target hardware. In some examples, the operation adjustment includes determining that the target hardware is in a utilization state based on an infrared image of the target hardware, where the utilization state is indicative of available bandwidth to execute an increased quantity of computing tasks, and assigning the increased quantity of computing tasks to the target hardware for execution based on the utilization state.

FIG. 1 is a schematic illustration of a first example visual recognition system 100 monitoring an example device 102 to provide run-time information of device utilization. In FIG. 1, the device 102 is a printed circuit board (PCB). For example, the device 102 can be one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). In some examples, the device 102 is included in a computing system, such as a server (e.g., a blade server, a rack-mounted server, etc.), a desktop computer, etc.

In the illustrated example of FIG. 1, the first visual recognition system 100 obtains images of the device 102, processes the obtained images, and determines runtime information associated with the device 102 based on the processed images. In FIG. 1, the first visual recognition system 100 includes an example visual recognition controller 104 and an example camera 106. The first visual recognition system 100 includes the visual recognition controller 104 to obtain images (e.g., still-images, video frames, etc.) captured by the camera 106 of the device 102. In such examples, the visual recognition controller 104 can process the obtained images to detect run-time anomalies and generate reports and/or alerts based on the detected run-time anomalies.

The visual recognition controller 104 of the illustrated example of FIG. 1 is hardware. For example, the visual recognition controller 104 can be one or more processors executing machine readable instructions. In other examples, the visual recognition controller 104 can be implemented by one or more integrated circuits, logic circuits, microprocessors, GPUs, DSPs, or controllers from any desired family or manufacturer. For example, the visual recognition controller 104 may be a semiconductor based (e.g., silicon based) device.

The camera 106 of the illustrated example of FIG. 1 is an infrared camera that includes one or more infrared image sensors (e.g., an infrared image sensor integrated circuit or device, an infrared image sensor array, etc.). For example, the camera 106 may translate and/or otherwise convert heat signatures of the device 102 into one or more machine-readable numbers (e.g., binary numbers, hex codes, etc.). In such examples, the camera 106 can generate a heat-map image of the device 102, a portion of the device 102, etc., based on the machine-readable numbers corresponding to the heat-signatures associated with the device 102. Accordingly, the camera 106 can transmit the heat-map image of the device 102 to the visual recognition controller 104 for analysis and processing.

The visual recognition controller 104 of the illustrated example of FIG. 1 includes an example model (e.g., a machine-learning model, a vision recognition model, etc.) 108 trained to classify images (e.g., infrared images) of the device 102 to determine and/or otherwise identify operating states, or utilization states, of the device 102. In FIG. 1, the model 108 is a machine-learning model. For example, the model 108 may be a neural network (e.g., a convolution neural network, a recurrent neural network, etc.), an image classification or image recognition model, etc. In other examples, the model 108 can be a pixel counting model that groups pixels by heat-signature intensity or strength and determines quantities of pixels in the pixel groups. In such examples, the model 108 can determine whether one or more of the quantities of pixels of the pixel groups satisfy a threshold value when the one or more of the quantities of pixels are greater than the threshold value.

In some examples, each utilization state corresponds to a loading condition, a heat-signature anomaly, etc., of the device 102. In such examples, the loading condition, the heat-signature anomaly, etc., can be represented by a performance utilization metric such as a utilization percentage of the device 102. For example, the device 102 may have a first utilization percentage of 60% corresponding to being 60% utilized, a second utilization percentage of 80% corresponding to being 80% utilized, etc. For example, the visual recognition controller 104 can determine that the device 102 is in a 40% utilization state when 40% of the physical hardware resources (e.g., computing resources, memory resources, processing resources, etc.) of the device 102 are being utilized. For example, the visual recognition controller 104 can feed an infrared image of the device 102 to the model 108 and the model can determine that the infrared image (e.g., heat-signatures included in the infrared image) corresponds to a 40% utilization state of the device 102.

In some examples, the visual recognition controller 104 can determine whether one or more actions are to be executed when the utilization state of the device 102 is determined. For example, the visual recognition controller 104, in response to determining the utilization state of the device 102, may execute one or more actions (e.g., computation actions, computation tasks, etc.) including generating and transmitting a report to an example computing platform 110 that includes one or more processors 112. For example, the visual recognition controller 104 may transmit a report including the image of the device 102, the utilization state of the device 102 associated with the image, etc., to the computing platform 110. In other examples, the visual recognition controller 104 can report an anomaly corresponding to an unidentified utilization state to the computing platform 110. In such examples, the computing platform 110 can query the visual recognition controller 104 for logging data, previously captured images of the device 102, etc., for further investigation of the unidentified utilization state. The computing platform 110 may invoke the processor(s) 112 to classify and/or otherwise identify the unidentified utilization state, generate an updated version of the model 108, and/or deploy the updated version of the model 108 to the visual recognition controller 104.

In some examples, the visual recognition controller 104 generates the model 108 by using supervised machine learning based training, where the visual recognition controller 104 is provided classified images (e.g., images with a known utilization state) to identify patterns of utilization states. In some examples, the visual recognition controller 104 generates the model 108 by using unsupervised machine learning based training (e.g., reinforcement machine learning based training), where the visual recognition controller 104 receives feedback from the device 102 to classify images and learn desired behavior or actions to execute when presented with an image corresponding to one of the classified images. In some examples, the visual recognition controller 104 generates the model 108 by using a combination of supervised and unsupervised learning algorithms, methods, techniques, etc., such as unsupervised clustering with a minimum number of classifying or labeling information. Alternatively, any other machine-learning algorithm, method, technique, etc., may be used to train the model 108.

In operation, the camera 106 captures an infrared image of the device 102 and transmits the infrared image to the visual recognition controller 104. The visual recognition controller 104 classifies the infrared image using the model 108 to determine a utilization state of the device 102. For example, the visual recognition controller 104 may determine that the utilization state corresponds to the device 102 being 80% utilized. The visual recognition controller 104 may determine one or more actions to be executed that are associated with the utilization state of 80% and execute the one or more actions.

In some examples, the visual recognition controller 104 determines whether one or more actions are to be executed when the utilization state satisfies a threshold (e.g., a utilization state threshold). For example, the visual recognition controller 104 may determine that no actions are to be executed when the utilization state of the device 102 is 20% when the utilization state threshold is 60%. In such examples, the visual recognition controller 104 may determine that one or more actions are to be executed when the utilization state of the device 102 is 80% because the utilization state of 80% is greater than the utilization state threshold of 60%.

In some examples, the one or more actions include generating a report. The visual recognition controller 104 can generate the report by including at least the utilization state. The visual recognition controller 104 can transmit the report to the computing platform 110. In response to obtaining the report from the visual recognition controller 104, the computing platform 110 may invoke the processor(s) 112 to perform a corrective action, a mitigation measure, etc., to change the utilization state of the device 102. For example, the processor(s) 112 may turn on a cooling system associated with the device 102, re-assign computation tasks from the device 102 to a different device, shutdown the device 102, etc., to change the utilization state of the device 102 (e.g., reduce the utilization of the device 102) from (1) a first utilization state indicative of a first utilization percentage to (2) a second utilization state indicative of a second utilization percentage, where the second utilization percentage is less than the first utilization percentage.

Figure 2:
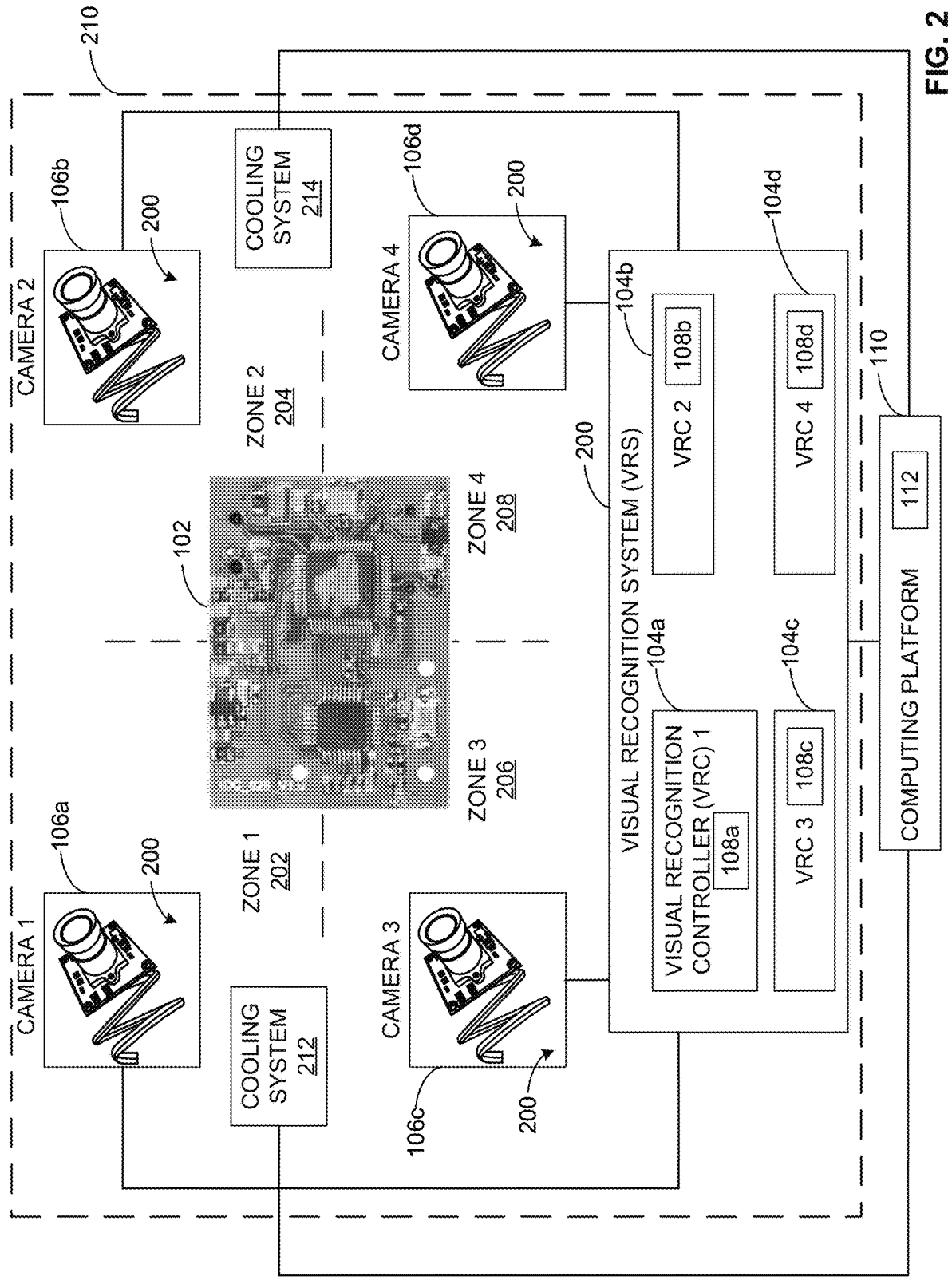
FIG. 2 is a schematic illustration of a second example visual recognition system monitoring the example device of FIG. 1 included in an example housing.

FIG. 2 is a schematic illustration of a second example visual recognition system 200 monitoring the device 102 of FIG. 1 to provide run-time information of device utilization. In the illustrated example of FIG. 2, the second visual recognition system 200 includes visual recognition controllers 104a-d. In FIG. 2, the visual recognition controllers 104a-d can correspond to instances of the visual recognition controller 104 of FIG. 1. The visual recognition controllers 104a-d of FIG. 2 include a first visual recognition controller 104a, a second visual recognition controller 104b, a third visual recognition controller 104c, and a fourth visual recognition controller 104d. Alternatively, the second visual recognition system 200 may include fewer or more visual recognition controllers 104a-d than depicted in FIG. 2.

In FIG. 2, the visual recognition controllers 104a-d include a respective one of the models (e.g., the machine-learning models, the vision recognition models, etc.) 108a-d. In FIG. 2, the models 108a-d can correspond to the model 108 of FIG. 1. In FIG. 2, the first visual recognition controller 104a includes a first model 108a, the second visual recognition controller 104b includes a second model 108b, the third visual recognition controller 104c includes a third model 108c, and the fourth visual recognition controller 104d includes a fourth model 108d. Alternatively, one or more of the visual recognition controllers 104a-d may include more than one model.

In the illustrated example of FIG. 2, the second visual recognition system 200 includes cameras 106a-d. In FIG. 2, the cameras 106a-d can correspond to instances of the camera 106 of FIG. 1. The cameras 106a-d of FIG. 2 include a first camera 106a, a second camera 106b, a third camera 106c, and a fourth camera 106d. Alternatively, there may be fewer or more cameras 106a-d than depicted in FIG. 2. Alternatively, one or more of the cameras 106a-d may be separate from the second visual recognition system 200.

In the illustrated example of FIG. 2, the cameras 106a-d capture images of the device 102 in example zones 202, 204, 206, 208 of an example housing 210 for a computing system. The housing 210 of FIG. 2 includes the device 102 and the second visual recognition system 200, which includes the cameras 106a-d. For example, the housing 210 may be a server case, a desktop computer housing, etc., or any other type of mechanical structure that includes a computing system. In FIG. 2, each of the cameras 106a-d is installed in a different section of the housing 210. Alternatively, one or more of the cameras 106a-d may be installed in the same or substantially similar section of the housing 210.

In the illustrated example of FIG. 2, the first camera 106a is installed in a first section (e.g., a first corner) of the housing 210, the second camera 106b is installed in a second section (e.g., a second corner) of the housing 210, the third camera 106c is installed in a third section (e.g., a third corner) of the housing 210, and the fourth camera 106d is installed in a fourth section (e.g., a fourth corner) of the housing 210. Alternatively, one or more of the cameras 106a-b may be installed in different locations or sections of the housing 210 (e.g., a section of the housing 210 between the first and third corners, a section of the housing 210 between the second and fourth corners, etc.).

In the illustrated example of FIG. 2, the cameras 106a-d capture images of the device 102 within a field of view or zone of the cameras 106a-d. For example, the first camera 106a may have a first focal length that can capture images of the device 102 within a first example field of view or example zone 202. For example, the first camera 106a may capture an image including a first portion, a first quadrant, a first section, etc., of the device 102, where the first portion, the first quadrant, the first section, etc., corresponds to the first zone 202. In FIG. 2, the second camera 106b captures images of a second portion of the device 102 within a second example zone 204. In FIG. 2, the third camera 106c captures images of a third portion of the device 102 within a third example zone 206. In FIG. 2, the fourth camera 106d captures images of a fourth portion of the device 102 within a fourth example zone 208. In some examples, one or more of the zones 202, 204, 206, 208 overlap.

In operation, the cameras 106a-d can capture and transmit images to a respective one of the visual recognition controllers 104a-d of the second visual recognition system 200 for utilization state classification. For example, the first camera 106a may transmit a first image of the first zone 202 of the device 102 to the first visual recognition controller 104a. In other examples, the second camera 106b can transmit a second image of the second zone 204 of the device 102 to the second visual recognition controller 104b, the third camera 106c can transmit a third image of the third zone 206 of the device 102 to the third visual recognition controller 104c, and the fourth camera 106d can transmit a fourth image of the fourth zone 208 of the device 102 to the fourth visual recognition controller 104d.

In the illustrated example of FIG. 2, the visual recognition controllers 104a-d can execute the models 108a-d to classify images from the cameras 106a-d to determine a utilization state of the device 102. In some examples, one or more of the visual recognition controllers 104a-d determine a utilization state of the device 102 corresponding to one of the zones 202, 204, 206, 208. For example, the first visual recognition controller 104a may determine a first utilization state of the first zone 202, the second visual recognition controller 104b may determine a second utilization state of the second zone 204, etc. In such examples, the second visual recognition system 200 can determine a third utilization state that corresponds to the device 102 based on the first utilization state, the second utilization state, etc., and/or a combination thereof. For example, the second visual recognition system 200 may aggregate, fuse, or average the utilization states associated with the zones 202, 204, 206, 208 of the device 102 to determine the third utilization state that corresponds to an entirety of the device 102.

In some examples, the second visual recognition system 200 determines a utilization state associated with an entirety of the device 102 based on a highest value of the utilization states associated with the zones 202, 204, 206, 208. For example, the first visual recognition controller 104a may determine a first utilization state of 40% for the first zone 202 and the second visual recognition controller 104b may determine a second utilization state of 80% for the second zone 204. In such examples, the second visual recognition system 200 can determine that the utilization state associated with the entirety of the device 102 is 80% based on the second utilization state of 80% being greater than the first utilization state of 40%. In other examples, the second visual recognition system 200 can determine that the utilization state of the device 102 is 60% based on an average of the first utilization state of 40% and the second utilization state of 80%.

In response to determining the utilization state of the device 102, the second visual recognition system 200 executes one or more actions associated with the utilization state. For example, the second visual recognition system 200 can execute an action that includes transmitting information to the computing platform 110 of FIG. 1. For example, the second visual recognition system 200 may transmit a report including at least one of (1) one or more images of the device 102 or (2) one or more utilization states associated with the one or more images.

In some examples, the computing platform 110 executes one or more actions when information from the second visual recognition system 200 is obtained. For example, the computing platform 110 may turn on a first example cooling system 212 and/or a second example cooling system 214 included in the housing 210 based on the utilization state. In FIG. 2, the cooling systems 212, 214 are convection fans. Alternatively, one or both of the cooling systems 212, 214 may be liquid cooling systems. The computing platform 110 may determine that a utilization state obtained from the second visual recognition system 200 has one or more associated actions including generating and transmitting a command to the cooling systems 212, 214 to turn on the cooling systems 212, 214. For example, the computing platform 110 may turn on or increase a strength of the cooling systems 212, 214 when the utilization state indicates a substantially high system utilization (e.g., 80%, 85%, 90%, etc.).

Figure 3:
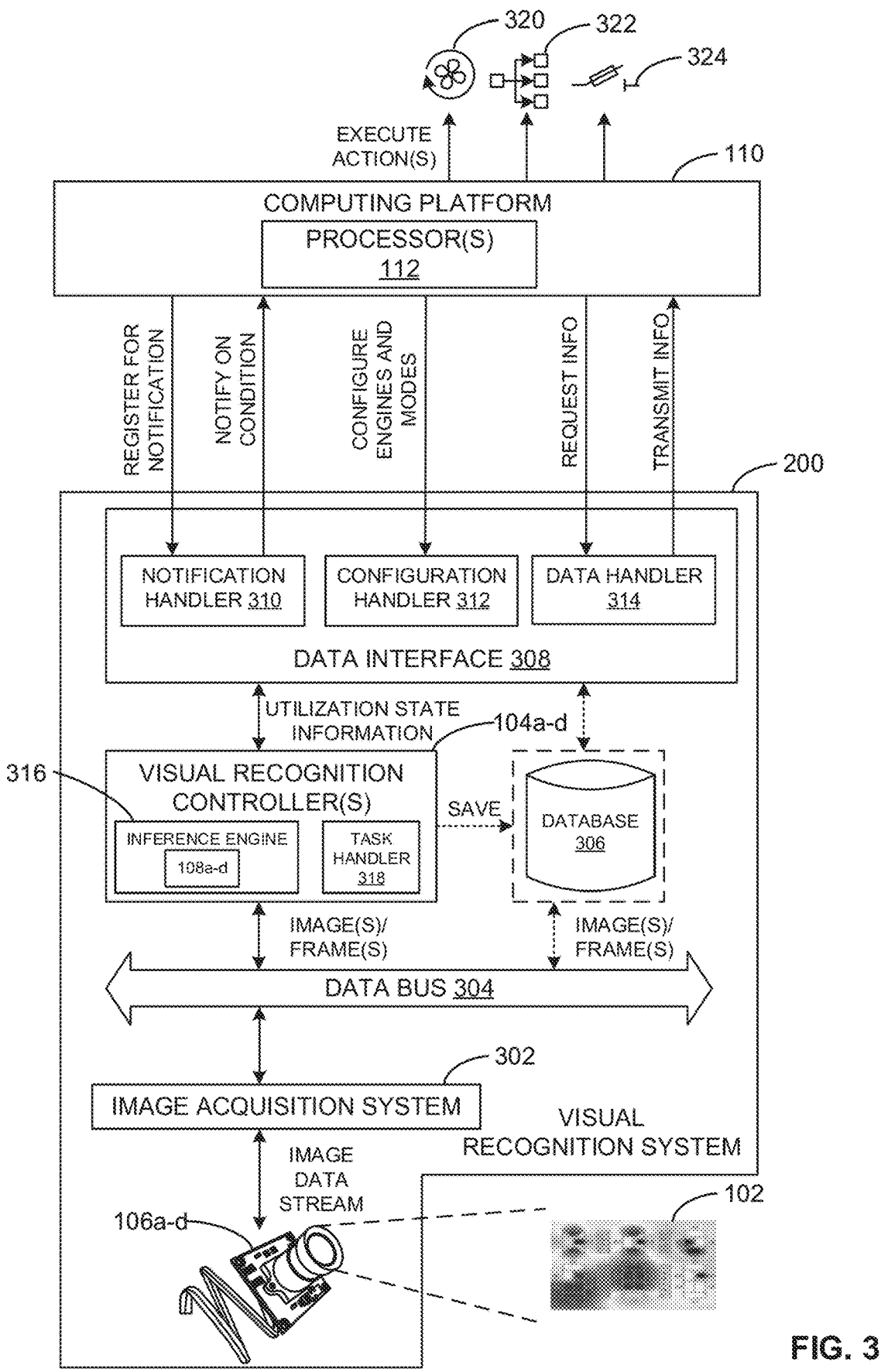
FIG. 3 is a block diagram of the example visual recognition system of FIGS. 1 and/or 2.

FIG. 3 is a block diagram of the second visual recognition system 200 of FIG. 2. In FIG. 3, the second visual recognition system 200 includes the cameras 106a-106d of FIG. 2. In FIG. 3, the second visual recognition system 200 includes an example image acquisition system 302, an example data bus 304, an example database 306, an example data interface 308, and the visual recognition controllers 104a-d of FIG. 2. In FIG. 3, the data interface 308 includes an example notification handler 310, an example configuration handler 312, and an example data handler 314. In FIG. 3, the visual recognition controllers 104a-d include an example inference engine 316 and an example task handler 318. In FIG. 3, the inference engine 316 includes one or more of the models 108a-d. Alternatively, the block diagram of FIG. 3 may be used to implement the first visual recognition system 100 of FIG. 1 when the visual recognition controllers 104a-d are replaced with the visual recognition controller 104 of FIG. 1, the cameras 106a-d are replaced with the camera 106 of FIG. 1, and the models 108a-d are replaced with the model 108 of FIG. 1. Accordingly, the description in connection with FIG. 3 is applicable to the first visual recognition system 100.

In the illustrated example of FIG. 3, the second visual recognition system 200 includes the image acquisition system 302 to obtain heat-map images, infrared video frames, etc., of a target device, such as the device 102 of FIG. 1. In FIG. 3, the image acquisition system 302 is an image processing module (e.g., a still-image processing module, a video processing module, etc.) that can convert first data in a first data format (e.g., a still-image format, a video format, etc.) from the cameras 106a-d into second data in a second data format to be used by the visual recognition controller(s) 104a-d. For example, the first data format may be an Audio Video Interleave (AVI) format, a Moving Picture Experts Group (MPG) format, an H.264 or MPEG-4 Part 10 format, etc. In other examples, the second data format can be a BMP file format (e.g., a bitmap image file, a device independent bitmap (DIB) file format, etc.), a Portable Network Graphics (PNG) file format, a Joint Photographic Experts Group (JPEG) file format, etc. In some examples, the image acquisition system 302 obtains a data stream including one or more images, video frames, etc., from the cameras 106a-d at a pre-defined or pre-configured interval. Alternatively, the cameras 106a-d may transmit the data stream to the image acquisition system 302 in response to a command or query from the image acquisition system 302.

In the illustrated example of FIG. 3, the second visual recognition system 200 includes the data bus 304 to share and/or otherwise distribute data from the image acquisition system 302 to at least one of the visual recognition controllers 104a-d or the database 306. In FIG. 3, the data bus 304 is a controllable, cyclic buffer (e.g., a first-in first-out (FIFO) buffer, a last-in first-out (LIFO) buffer, etc.) that can share images, frames, etc., in the second data format as described above. Alternatively, the data bus 304 may transmit or share data in any other data format.

In the illustrated example of FIG. 3, the second visual recognition system 200 includes the database 306 to record data (e.g., a model configuration, an infrared image, an infrared video frame, a utilization state, an action associated with the utilization state, a data log, etc.). The database 306 may be implemented by a non-volatile memory (e.g., read-only memory (ROM), electrically erasable programmable read-only memory (EEPROM), flash memory, etc.), a volatile memory (e.g., Synchronous Dynamic Random Access Memory (SDRAM), Dynamic Random Access Memory (DRAM), etc., and/or any other type of random access memory (RAM) device), etc. The database 306 may additionally or alternatively be implemented by one or more double data rate (DDR) memories, such as DDR, DDR2, DDR3, DDR4, mobile DDR (mDDR), etc. The database 306 may additionally or alternatively be implemented by one or more mass storage devices such as hard disk drive(s), compact disk drive(s), digital versatile disk drive(s), etc. While in the illustrated example the database 306 is illustrated as a single database, the database 306 may be implemented by any number and/or type(s) of databases. Furthermore, the data stored in the database 306 may be in any data format such as, for example, binary data, comma delimited data, tab delimited data, structured query language (SQL) structures, image data, video frame data, etc.

In the illustrated example of FIG. 3, the second visual recognition system 200 includes the data interface 308 to facilitate interaction between the computing platform 110 of FIGS. 1-2 and the second visual recognition system 200. In FIG. 3, the data interface 308 corresponds to a set of one or more application programming interfaces (APIs) that expose the second visual recognition system 200 to the processor(s) 112 of FIGS. 1-2, and/or, more generally, the computing platform 110. For example, the data interface 308 may include one or more APIs that enable the processor(s) 112 to configure a parameter of the models 108a-d, specify an event and/or condition of interest to be flagged by the visual recognition controllers 104a-d, register for a notification of the event and/or the condition of interest with the second visual recognition system 200, and/or retrieve information from the database 306.

In the illustrated example of FIG. 3, the data interface 308 includes the notification handler 310 to register the computing platform 110 with the second visual recognition system 200 for one or more notifications (e.g., alerts) associated with one or more utilization states of the device 102. In some examples, a notification can include a utilization state of the device 102. For example, the notification handler 310 may register the computing platform 110 to receive a first notification when the device 102 has a first utilization state, a second notification when the device 102 has a second utilization state different from the first utilization state, etc. In such examples, the notification handler 310 can transmit the first notification including the first utilization state to the computing platform 110.

In some examples, the notification handler 310 generates a command to the computing platform 110 to affect an operation of the device 102. For example, the inference engine 316 may invoke the notification handler 310 to generate a command to increase or decrease a quantity of computation tasks to be executed by the device 102 to adjust a temperature at one or more portions of the device 102. In such examples, the notification handler 310 can facilitate the inference engine 316 training the models 108a-d using unsupervised machine learning as described below in connection with FIG. 5.

In the illustrated example of FIG. 3, the data interface 308 includes the configuration handler 312 to configure a training mode of the models 108a-d. For example, the processor(s) 112 may invoke the configuration handler 312 to instruct the models 108a-d to train using supervised learning, unsupervised learning, etc., and/or a combination thereof. In such examples, when the configuration handler 312 instructs the inference engine 316 to train and/or otherwise operate the models 108a-d using supervised learning, the inference engine 316 may obtain previously classified images from the computing platform 110 to generate the models 108a-d.

In some examples, the configuration handler 312 adjusts a parameter of the models 108a-d. For example, when the models 108a-d are convolution neural networks, the configuration handler 312 can adjust a neuron weight, a filter, a pool area, etc., of the convolution neural networks. In some examples, the configuration handler 312 determines one or more actions associated with a utilization state. For example, the configuration handler 312 may obtain a first set of one or more actions from the computing platform 110 to be associated with a first utilization state, a second set of one or more actions from the computing platform 110 to be associated with a second utilization state, etc. For example, the first set of one or more actions can include enabling or disabling a cooling system, performing a load balance operation, shutting down the device 102, etc. In such examples, the visual recognition controllers 104a-d can obtain the first set of actions from the configuration handler 312 when a first utilization state of the device 102 is identified.

In some examples, the visual recognition controllers 104a-d invoke the processor(s) 112 to execute one or more actions to adjust operation of the device 102. In such examples, the one or more actions can include activating the cooling systems 212, 214 of FIG. 2, executing a load balance operation, and/or shutting down the device 102. Alternatively, the configuration handler 312 may determine that no actions are to be executed by the second visual recognition system 200 when the first utilization state is identified.

In some examples, the visual recognition controllers 104a-d invoke the processor(s) 112 to perform a load balance operation by re-routing computing tasks assigned to the device 102 to a different device. For example, the notification handler 310 may transmit a report to the processor(s) 112 that includes a utilization state of the device 102. In such examples, when the utilization state of the device 102 is obtained, the processor(s) 112 can reduce a quantity of computing tasks to be executed by the device 102. In some examples, the processor(s) 112 perform a load balance operation by increasing a quantity of computing tasks to be executed by the device 102 based on a utilization state of the device 102. For example, the processor(s) 112 may determine that the utilization state of the device 102 is 20% utilization based on an infrared image of the device 102. In such examples, the processor(s) 112 can determine that the device 102 has availability (e.g., available bandwidth) to execute an increased quantity of computing tasks. In such examples, the processor(s) 112 can assign one or more computing tasks to be executed by the device 102. Advantageously, the visual recognition systems 100, 200 can improve and/or otherwise adjust the utilization of the device 102 based on determining a utilization state of the device 102 by classifying an infrared image of the device 102 using a machine-learning model.

In the illustrated example of FIG. 3, the data interface 308 includes the data handler 314 to facilitate data management operations associated with the database 306. In some examples, the data handler 314 transmits information from the database 306 to the computing platform 110. For example, the data handler 314 may obtain an image, a video frame, etc., from the database 306 and transmit the image, the video frame, etc., to the computing platform 110. In some examples, the data handler 314 transmits a data log including one or more utilization states to the computing platform 110. In some examples, the data handler 314 deletes information from the database 306 to generate available space for new information from the computing platform 110, the cameras 106a-d, etc.

In the illustrated example of FIG. 3, the visual recognition controllers 104a-d include the inference engine 316 to train and execute the models 108a-d. In FIG. 3, the inference engine 316 includes one of the models 108a-d. In some examples, the inference engine 316 trains the models 108a-d to recognize, classify, and/or otherwise identify a utilization state of the device 102. In such examples, the inference engine 316 can use supervised learning, unsupervised learning, etc., and/or a combination thereof to train the models 108a-d. For example, the inference engine 316 may execute the models 108a-d to determine a utilization state of the device 102 based on a loading pattern, a runtime anomaly (e.g., a heat-signature anomaly), etc.

In the illustrated example of FIG. 3, the visual recognition controllers 104a-d include the task handler 318 to execute one or more actions (e.g., computation actions), tasks (e.g., computation tasks), etc., in connection with the models 108a-d. In some examples, the task handler 318 facilitates training of the models 108a-d. In some examples, the task handler 318 transmits training images (e.g., previously classified images from the computing platform 110, unclassified images captured by the cameras 106a-d, etc.) to the models 108a-d for training.

In some examples, the task handler 318 stores images of interest from the cameras 106a-d in the database 306. For example, the models 108a-d may determine that an image of the device 102 corresponds to an anomaly or unidentifiable utilization state. In such examples, the task handler 318 can store the image in the database 306 for further training (e.g., re-training) of the models 108a-d. For example, the task handler 318 can use a probability and a confidence of a classification output from the inference engine 316 associated with the image to determine whether to store the image for further re-training or analysis. In some examples, the image of the anomaly can be transmitted to the computing platform 110 to re-train the models 108a-d external to the second visual recognition system 200. In some examples, the image of the anomaly can be executed by the models 108a-d when the models 108a-d enter a re-training mode.

In the illustrated example of FIG. 3, the computing platform 110 can execute one or more example actions 320, 322, 324 when the inference engine 316 determines a utilization state of the device 102. For example, the inference engine 316 may invoke the notification handler 310 to transmit a report including the utilization state of the device 102 to the computing platform 110. When the computing platform 110 obtains the utilization state, the computing platform 110 may execute zero, one or more of the actions 320, 322, 324, where the actions 320, 322, 324 include a first action 320, a second action 322, and a third action 324. Alternatively, fewer or more actions may be executed by the computing platform 110. In FIG. 3, the first action 320 can include obtaining an image, a video frame, etc., from the database 306. In FIG. 3, the second action 322 can include a load balance action that includes re-directing and/or otherwise adjusting a quantity of processing tasks assigned to the device 102 for execution to one or more different devices than the device 102. In some examples, the second action 322 can include increasing a quantity of computation tasks assigned to the device 102 when the utilization state of device 102 indicates that the device 102 has bandwidth for additional computation tasks. In FIG. 3, the third action 324 can include shutting down or turning off the device 102 by invoking a circuit breaker to open a voltage supply line to the device 102.

While an example manner of implementing the second visual recognition system 200 of FIG. 2 is illustrated in FIG. 3, one or more of the elements, processes, and/or devices illustrated in FIG. 3 may be combined, divided, re-arranged, omitted, eliminated, and/or implemented in any other way. Further, the example visual recognition controllers 104a-d, the example cameras 106a-d, the example models 108a-d, the example image acquisition system 302, the example data bus 304, the example database 306, the example data interface 308, the example notification handler 310, the example configuration handler 312, the example data handler 314, the example inference engine 316, the example task handler 318, and/or, more generally, the example visual recognition system 200 of FIG. 2 may be implemented by hardware, software, firmware, and/or any combination of hardware, software, and/or firmware. Thus, for example, any of the example visual recognition controllers 104a-d, the example cameras 106a-d, the example models 108a-d, the example image acquisition system 302, the example data bus 304, the example database 306, the example data interface 308, the example notification handler 310, the example configuration handler 312, the example data handler 314, the example inference engine 316, the example task handler 318, and/or, more generally, the example visual recognition system 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example visual recognition controllers 104a-d, the example cameras 106a-d, the example models 108a-d, the example image acquisition system 302, the example data bus 304, the example database 306, the example data interface 308, the example notification handler 310, the example configuration handler 312, the example data handler 314, the example inference engine 316, and/or the example task handler 318 is/are hereby expressly defined to include a non-transitory computer readable storage device or storage disk such as a memory, a digital versatile disk (DVD), a compact disk (CD), a Blu-ray disk, etc., including the software and/or firmware. Further still, the example visual recognition system 200 of FIG. 2 may include one or more elements, processes, and/or devices in addition to, or instead of, those illustrated in FIG. 3, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
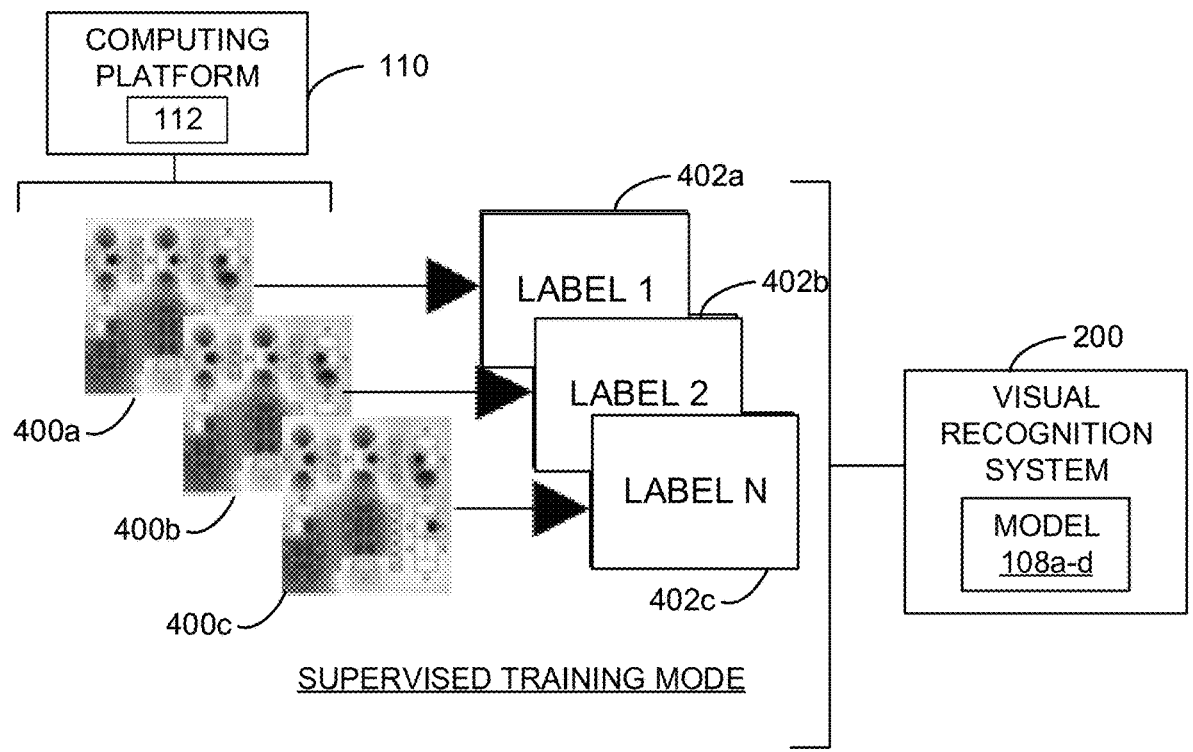
FIG. 4 is a schematic illustration of the example visual recognition system of FIGS. 2-3 training an example visual recognition model using supervised machine learning.

FIG. 4 is a schematic illustration of the second visual recognition system 200 of FIGS. 2-3 training the models 108a-d of FIGS. 2-3 using supervised learning or when operating in a supervised training mode. Alternatively, the schematic illustration of FIG. 4 may be applicable to the first visual recognition system 100 of FIG. 1 training the model 108 of FIG. 1.

In operation, the computing platform 110 of FIGS. 1-3 induces the device 102 of FIGS. 1-3 to operate in a utilization state of interest. For example, the processor(s) 112 of the computing platform 110 may instruct the device 102 to execute zero, one, or more computation tasks. In such examples, the device 102 can be brought to a utilization state of interest (e.g., a utilization state of 20%, 40%, 80%, etc.). When the computing platform 110 induces the device 102 to be brought to the utilization state of interest, the second visual recognition system 200 captures one or more example infrared images 400a-c of the device 102. The computing platform 110 can provide one of example labels 402a-c to associate with the one or more example infrared images 400a-c.

For example, the computing platform 110 may cause the device 102 to operate in a first utilization state of 20%. The computing platform 110 may transmit a first example label (Label 1) 402a to the second visual recognition system 200. When the device 102 is brought to the first utilization state of 20%, the second visual recognition system 200 captures a first example infrared image 400a and associates the first infrared image 400a with the first label 402a. In FIG. 4, the computing platform 110 can induce the device 102 to adjust to a second utilization state of 40%. The computing platform 110 may transmit a second example label (Label 2) 402b to the second visual recognition system 200. When the device 102 is brought to the second utilization state of 40%, the second visual recognition system 200 captures a second example infrared image 400b and associates the second infrared image 400b with the second label 402b.

In the illustrated example of FIG. 4, the computing platform 110 can induce the device 102 to adjust to a third utilization state of 80%. The computing platform 110 may transmit a third example label (Label N) 402c to the second visual recognition system 200. When the device 102 enters the third utilization state of 80%, the second visual recognition system 200 captures a third example infrared image 400c and associates the third infrared image 400c with the third label 402c. In FIG. 4, the second visual recognition system 200 can train the models 108a-d based on the associations in connection with the infrared images 400a-c and the labels 402a-c. Alternatively, fewer or more than the three associations depicted in FIG. 4 may be executed by the second visual recognition system 200.

Figure 5:
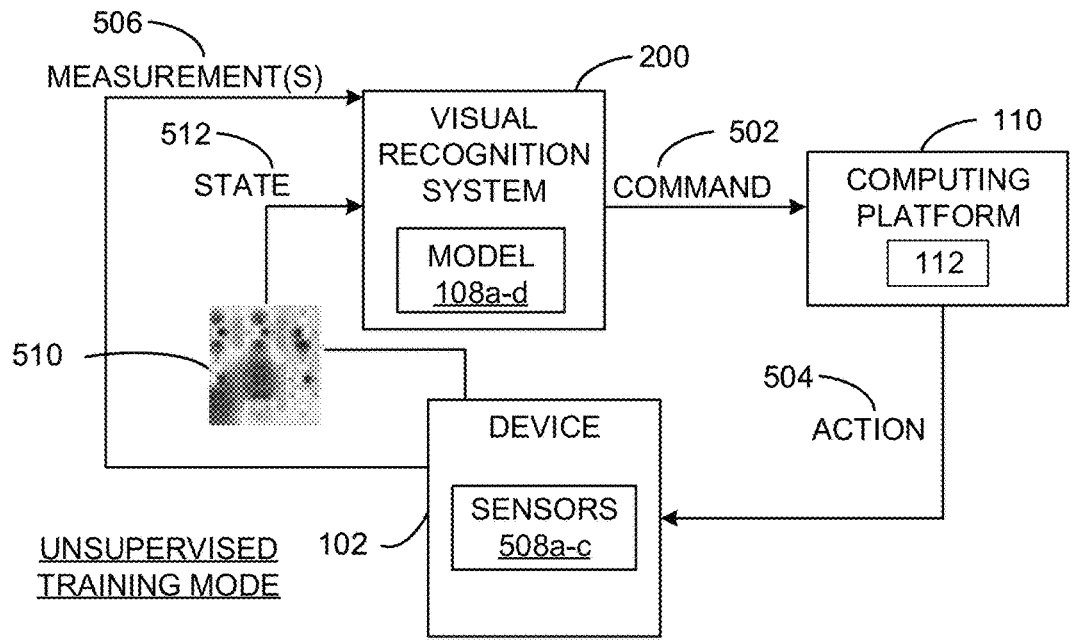
FIG. 5 is a schematic illustration of the example visual recognition system of FIGS. 2-3 training an example visual recognition model using unsupervised machine learning.

FIG. 5 is a schematic illustration of the second visual recognition system 200 of FIGS. 2-3 training the models 108a-d of FIGS. 2-3 using unsupervised learning or when operating in an unsupervised training mode. Alternatively, the schematic illustration of FIG. 5 may be applicable to the first visual recognition system 100 of FIG. 1 training the model 108 of FIG. 1.

In the illustrated example of FIG. 5, the second visual recognition system 200 trains the models 108a-d by causing the device 102 of FIGS. 1-3 to enter a utilization state and obtain feedback (e.g., a utilization state, a temperature measurement, etc.) from the device 102 to classify utilization states and learn desired behavior to influence and/or otherwise affect the utilization states. For example, the second visual recognition system 200 may generate an example command 502 to the computing platform 110 to affect operation of the device 102. In such examples, the command 502 can correspond to increasing a temperature at a portion of the device 102 (e.g., an input/output (I/O) bank, a memory register, etc.) by assigning computation tasks to the portion of the device 102. In other examples, the command 502 can correspond to decreasing a temperature at the portion of the device 102 by reducing and/or otherwise not assigning computation tasks to the portion of the device 102.

In the illustrated example of FIG. 5, the computing platform 110 can determine that the command 502 corresponds to assigning one or more computation tasks to a portion of the device 102, such as a first I/O bank of the device 102. The computing platform 110 can invoke the one or more processors 112 to execute an example action 504 including instructing the first I/O bank of the device 102 to execute the one or more computation tasks. In response to executing the one or more computation tasks, the device 102 provides feedback to the second visual recognition system 200.

In the illustrated example of FIG. 5, the feedback includes one or more example measurements 506 associated with one or more portions of the device 102, and/or, more generally, the device 102. In FIG. 5, the device 102 includes example sensors 508a-c including a first sensor 508a, a second sensor 508b, and a third sensor 508c to generate the one or more measurements 506. Alternatively, the device 102 may include fewer or more sensors than depicted in FIG. 5. The sensors 508a-c of FIG. 5 are temperature sensors. For example, the first sensor 508a may measure a first temperature of a first portion (e.g., a first I/O bank), the second sensor 508b may measure a second temperature of a second portion (e.g., a second I/O bank), and the third sensor 508c may measure a third temperature of a third portion (e.g., a third I/O bank) of the device 102. For example, the data handler 314, and/or, more generally, the data interface 308 may obtain the measurement 506 from the device 102.

In the illustrated example of FIG. 5, the feedback includes an example infrared image 510 of the device 102 corresponding to an example utilization state 512. In FIG. 5, the second visual recognition system 200 can associate the measurements 506 with the infrared image 510. In some examples, the second visual recognition system 200 provides the models 108a-d with a reward (e.g., a model reward, a model training reward, etc.) when the command 502 causes a desired action to occur. For example, the second visual recognition system 200 may generate the command 502 to cause a first temperature of a first I/O bank of interest to increase. In such examples, the second visual recognition system 200 can obtain a first reward having a first value indicative of a maximum reward value when the first temperature of the first I/O bank obtained from the first sensor 508a increases based on the command 502. In other examples, the second visual recognition system 200 can obtain a second reward having a second value less than the first value when the first temperature of the first I/O bank does not increase based on the command 502. In yet other examples, the second visual recognition system 200 can obtain a third reward having a third value less than the second value when a second temperature of the second I/O bank obtained from the second sensor 508b increases while the first temperature does not increase. In such examples, the third value may be 0 or a negative value to disincentivize the second visual recognition system 200 from generating the command 502 that produced the undesired results.

In some examples, the second visual recognition system 200 determines that the device 102 has reached a utilization state of interest based on the measurements 506. For example, the models 108a-d may include pre-defined associations with temperature measurements and utilization states. In such examples, a first utilization state of 20% can be associated with the first and second sensors 508a-b measuring a first temperature value and the third sensor 508c measuring a second temperature value different from the first temperature value. Accordingly, the models 108a-d may store the infrared image 510 and associate the infrared image 510 as corresponding to the first utilization state of 20% utilization when the measurement 506 associated with the sensors 508a-c agree with and/or otherwise correspond to a pre-defined association.

In the illustrated example of FIG. 5, the second visual recognition system 200 trains and/or otherwise generates the models 108a-d through an iterative process of generating different ones of the command 502 to cause the computing platform 110 to induce different behaviors (e.g., temperature changes) of the device 102 to operate in different utilization states. Accordingly, the second visual recognition system 200 can obtain feedback (e.g., the measurement 506, the infrared image 510, the utilization state 512, etc.) to determine how the command 502 affects the temperature of one or more portions of the device 102 and determine a desired set of actions to perform for a given utilization state of the device 102.

Figure 6:
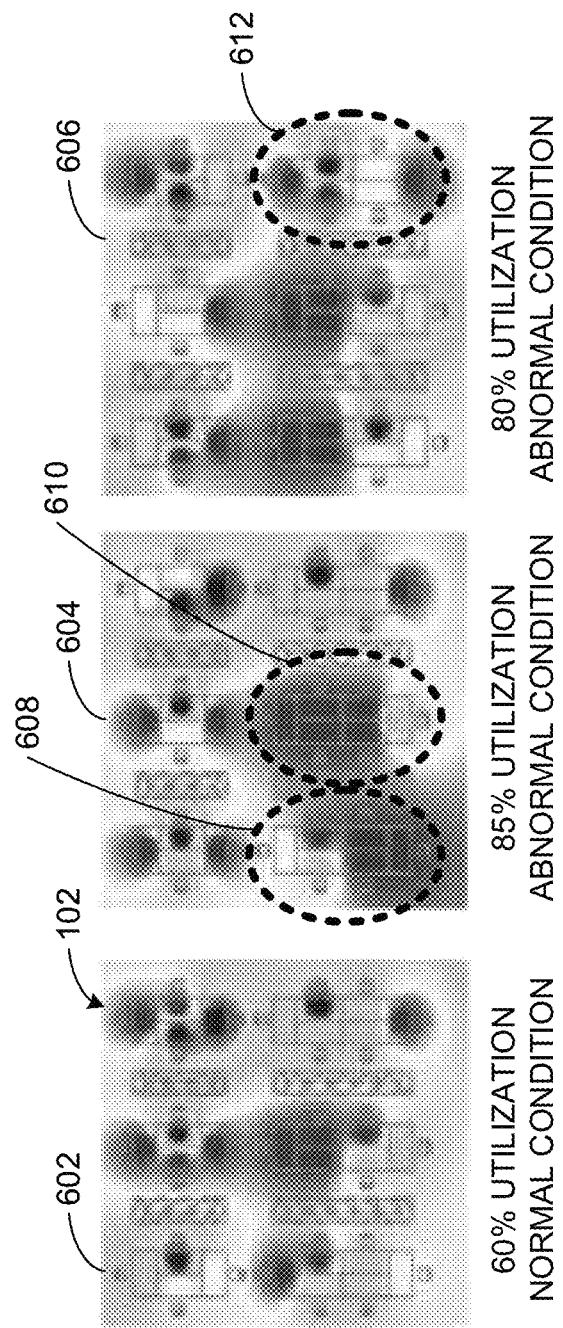
FIGS. 6A-6C depict example images of the example device of FIG. 1 in example utilization states.

FIGS. 6A-6C depict example infrared images 602, 604, 606 of the device 102 of FIGS. 1-3 in different example utilization states. In FIG. 6A, a first example infrared image 602 corresponds to a 60% utilization state. For example, the 60% utilization state may correspond to a normal operating condition of the device 102 because portions of the device 102 are not overloaded or operating incorrectly, which can be demonstrated by dense and/or otherwise intense heat signatures covering a substantial portion of the device 102.

In the illustrated example of FIG. 6B, a second example infrared image 604 corresponds to an 85% utilization state. For example, the 85% utilization state may correspond to an abnormal condition. In FIG. 6B, the abnormal condition is demonstrated by I/O Bank 1 608 and I/O Bank 2 610 having exceptional cache coherence misses, which cause intense heat-signatures to cover a substantial portion of the I/O Banks 608, 610.

In the illustrated example of FIG. 6C, a third example infrared image 606 corresponds to an 80% utilization state. For example, the 80% utilization state may correspond to an abnormal condition. In FIG. 6C, the abnormal condition is demonstrated by I/O Bank 3 612 being overloaded, which causes intense heat-signatures to cover a substantial portion of I/O Bank 3 612.

An example data diagram and example flowcharts representative of example hardware logic, machine readable instructions, hardware implemented state machines, and/or any combination thereof for implementing the example visual recognition systems 100, 200 of FIGS. 1, 2, and/or 3 are shown in FIGS. 7-11. The machine readable instructions may be an executable program or portion of an executable program for execution by a computer processor such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the data diagram and the flowcharts illustrated in FIGS. 7-11, many other methods of implementing the example visual recognition systems 100, 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 7-11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B.

Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 7:
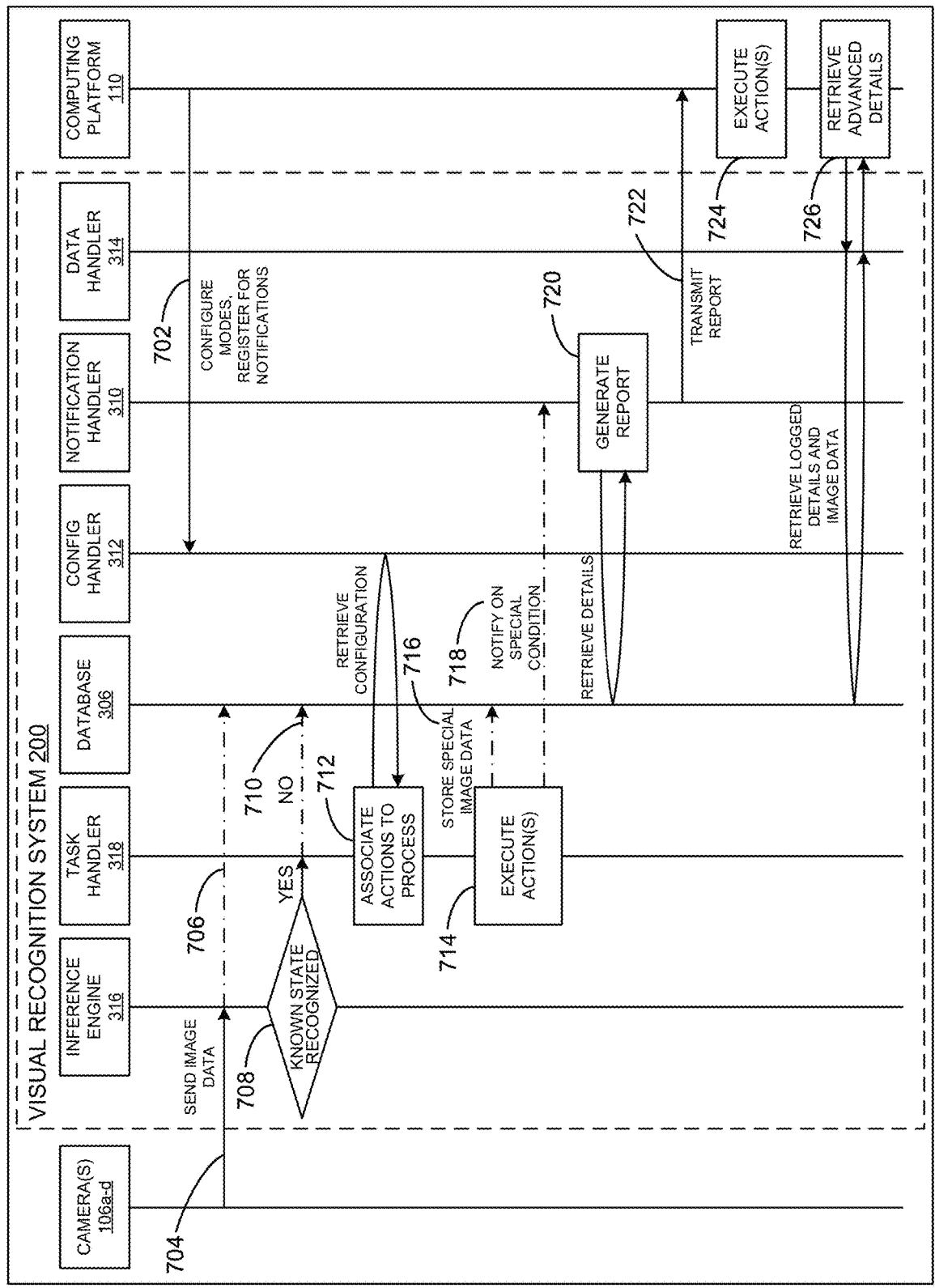
FIG. 7 is an example data flow diagram corresponding to operation of the example visual recognition system of FIGS. 1, 2, and/or 3.

FIG. 7 is an example data flow diagram 700 corresponding to operation of the second visual recognition system 200 of FIGS. 2-3. Alternatively, the data flow diagram 700 may correspond to operation of the first visual recognition system 100 of FIG. 1. At a first example operation 702, the computing platform 110 configures the second visual recognition system 200. For example, the computing platform 110 may invoke the configuration (CONFIG) handler 312 of FIG. 3 to configure a training mode of the models 108a-d, adjust a parameter of the models 108a-d, register one or more utilization states to invoke a notification when the one or more utilization states are recognized, etc.

At a second example operation 704, one or more of the cameras 106a-d of FIGS. 2-3 transmit image data (e.g., an infrared still image, an infrared video frame, etc.) to the inference engine 316 of FIGS. 2-3. For example, the first camera 106a of FIGS. 2-3 may transmit an infrared still image, one or more infrared video frames, etc., of a first portion of the device 102 of FIGS. 1-3 to the inference engine 316. Additionally or alternatively, at a third example operation 706, the first camera 106a may send image data to the database 306 of FIG. 3 for storage.

At a fourth example operation 708, the inference engine 316 determines whether a known state associated with the image data is recognized. For example, the inference engine 316 may feed an infrared image from the first camera 106a to the first model 108a of FIGS. 2-3. In such examples, the first model 108a can classify the infrared image as corresponding to a utilization state of 40%, 60%, 80%, etc. Alternatively, the first model 108a may be unable to classify the infrared image and, thus, identify the infrared image as corresponding to an anomaly.

If the inference engine 316 does not determine that a known state is recognized, then, at a fifth example operation 710, the infrared image associated with the unrecognized utilization state is stored in the database 306 for further re-training of one or more of the models 108a-d. If the inference engine 316 determines that a known state is recognized, then, at a sixth example operation 712, the task handler 318 of FIG. 3 retrieves a configuration from the configuration handler 312, where the configuration includes one or more associations of the known utilization state and one or more actions to process. For example, the configuration may include a first association of a utilization state of 85% and a first action to generate a report.

At a seventh example operation 714, the task handler 318 executes one or more actions. For example, the task handler 318 may store special image data in the database 306 at an eighth example operation 716. In such examples, the task handler 318 can store infrared images corresponding to an unidentified utilization state, an anomaly, etc., in the database 306. In other examples, the task handler 318 can invoke the notification handler 310 of FIG. 3 at a ninth example operation 718 to notify the computing platform 110 of FIGS. 1-3 regarding the known state.

At a tenth example operation 720, the notification handler 310 generates a report when invoked by the task handler 318. For example, the notification handler 310 can generate a report including at least one of a utilization state corresponding to the known state, the infrared image associated with the utilization state, a data log, etc. In such examples, the notification handler 310 can obtain details for the report from the database 306.

At an eleventh example operation 722, the notification handler 310 transmits the report to the computing platform 110. At a twelfth example operation 724, the computing platform 110 executes one or more actions based on the report. For example, the computing platform 110 may activate and/or otherwise enable the cooling systems 212, 214 of FIG. 2 based on the known state indicated by the report. In other examples, the computing platform 110 can retrieve advanced details from the database 306 at a thirteenth example operation 726. For example, the computing platform 110 can request a data log, one or more infrared images, one or more infrared video frames, etc., from the database 306 via the data handler 314 of FIG. 3. In such examples, the data handler 314 can obtain the requested information from the database 306 and transmit the obtained information to the computing platform 110.

Figure 8:
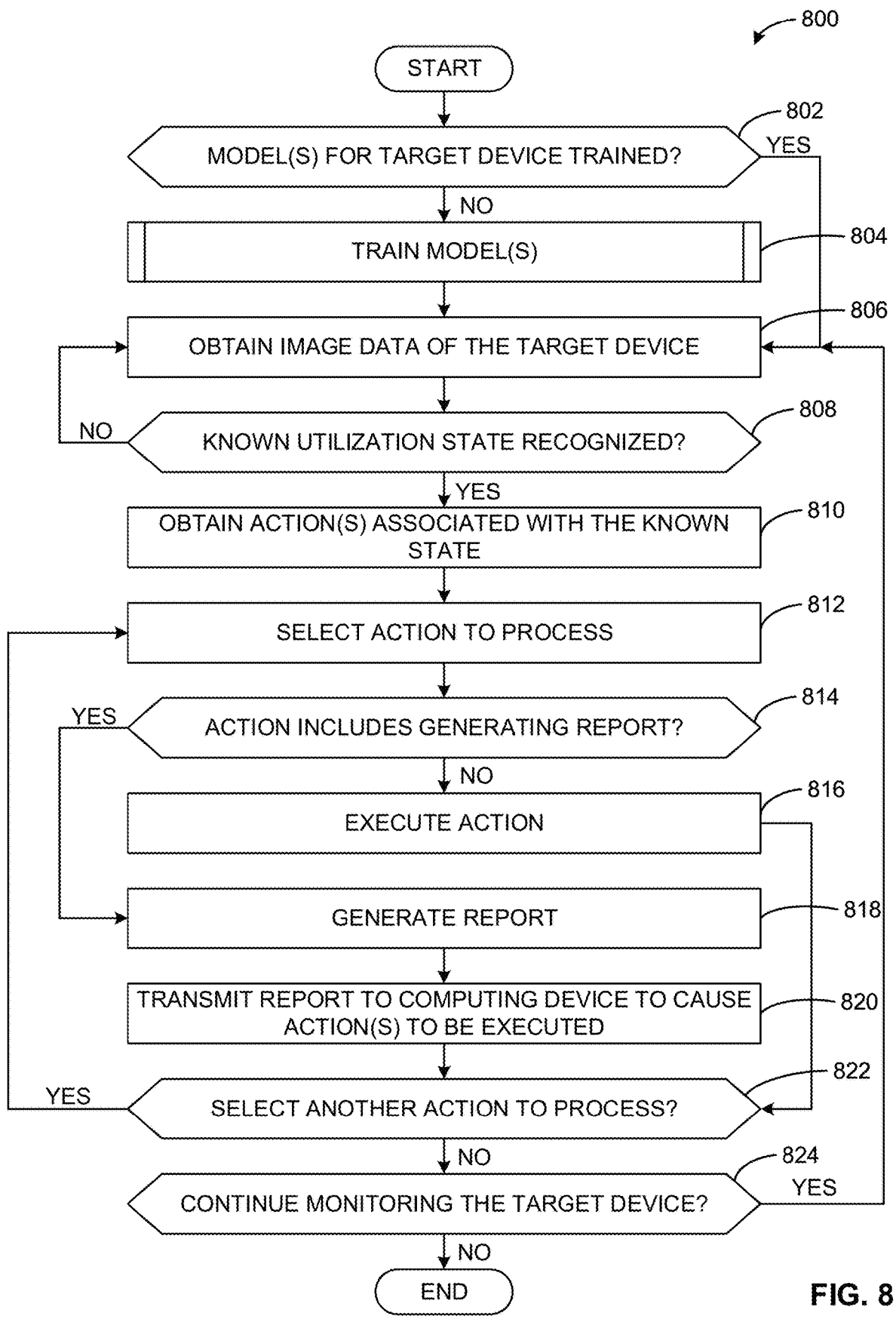
FIG. 8 is a flowchart representative of example machine readable instructions that may be executed to implement the example visual recognition system of FIGS. 1, 2, and/or 3 to monitor the example device of FIG. 1.

FIG. 8 is a flowchart representative of example machine readable instructions 800 that may be executed to implement the visual recognition systems 100, 200 of FIGS. 1, 2, and/or 3 to monitor the device 102 of FIGS. 1-3. The example machine readable instructions 800 of FIG. 8 begin at block 802, at which the visual recognition systems 100, 200 determine whether model(s) for a target device are trained. For example, the inference engine 316 (FIG. 3) may determine that the models 108a-d of FIGS. 2-3 for monitoring the device 102 of FIGS. 1-3 are not trained.

If, at block 802, the visual recognition systems 100, 200 determine that the model(s) for the target device are trained, control proceeds to block 806 to obtain image data of the target device. If, at block 802, the visual recognition systems 100, 200 determine that the model(s) for the target device are not trained, then, at block 804, the visual recognition systems 100, 200 train the model(s). For example, the inference engine 316 may use supervised learning, unsupervised learning, etc., and/or a combination thereof to train the models 108a-d. An example process that may be used to implement block 804 is described below in connection with FIG. 9.

At block 806, the visual recognition systems 100, 200 obtain image data of the target device. For example, the image acquisition system 302 (FIG. 3) may obtain one or more infrared images, one or more infrared video frames, etc., from one or more of the cameras 106a-d of FIGS. 2-3 of the device 102.

At block 808, the visual recognition systems 100, 200 determine whether a known utilization state is recognized. For example, the inference engine 316 may execute the models 108a-d to classify one or more infrared images as corresponding to a utilization state of the device 102 of 80% utilization. In other examples, the inference engine 316 can determine that the utilization state of the device 102 corresponds to an anomaly, where the models 108a-d are unable to classify the one or more infrared images.

If, at block 808, the visual recognition systems 100, 200 determine that a known utilization state is not recognized, control returns to block 806 to obtain additional image data of the target device. Alternatively, the visual recognition systems 100, 200 may store the image data in the database 306 for re-training of the models 108a-d. If, at block 808, the visual recognition systems 100, 200 determine that a known utilization state is recognized, then, at block 810, the visual recognition systems 100, 200 obtain action(s) associated with the known utilization state. For example, the task handler 318 (FIG. 3) may obtain one or more actions associated with the known utilization state from the configuration handler 312 (FIG. 3).

At block 812, the visual recognition systems 100, 200 select an action to process. For example, the task handler 318 may select a first action in the one or more actions obtained from the configuration handler 312 to process. At block 814, the visual recognition systems 100, 200 determine whether the action includes generating a report. For example, the task handler 318 may determine that the selected action includes generating a report.

If, at block 814, the visual recognition systems 100, 200 determine that the action does not include generating a report, then, at block 816, the visual recognition systems 100, 200 execute the action. For example, the task handler 318 may execute an action such as storing the one or more infrared video frames in the database 306. In other examples, the task handler 318 can delete previously stored data logs, image data, etc., from the database 306. In response to executing the action at block 816, control proceeds to block 822 to determine whether to select another action to process.

If, at block 814, the visual recognition systems 100, 200 determine that the action includes generating a report, control proceeds to block 818 to generate the report. For example, the task handler 318 may generate a report including at least one of the known utilization state, the image data associated with the known utilization state, a data log, etc.

At block 820, the visual recognition systems 100, 200 transmit the report to a computing device to cause action(s) to be executed. For example, the task handler 318 may invoke the notification handler 310 to transmit the report to the computing platform 110 of FIGS. 1-3. In such examples, the computing platform 110 can invoke the one or more processors 112 of FIGS. 1-3 to obtain information from the database 306, turn on the cooling systems 212, 214 of FIG. 2, load balance computing tasks assigned to the device 102, etc., and/or a combination thereof.

At block 822, the visual recognition systems 100, 200 determine whether to select another action to process. For example, the task handler 318 may select another action associated with the known utilization state to process. If, at block 822, the visual recognition systems 100, 200 determine to select another action to process, control returns to block 812 to select another action to process. If, at block 822, the visual recognition systems 100, 200 determine not to select another action to process, then, at block 824, the visual recognition systems 100, 200 determine whether to continue monitoring the target device. For example, the computing platform 110 may shutdown the device 102 in response to identifying the known utilization state. In such examples, the image acquisition system 302 can determine not to obtain image data from one or more of the cameras 106a-d. If, at block 824, the visual recognition systems 100, 200 determine to continue monitoring the target device, control returns to block 806 to obtain image data of the target device, otherwise the machine readable instructions 800 of FIG. 8 conclude.

Figure 9:
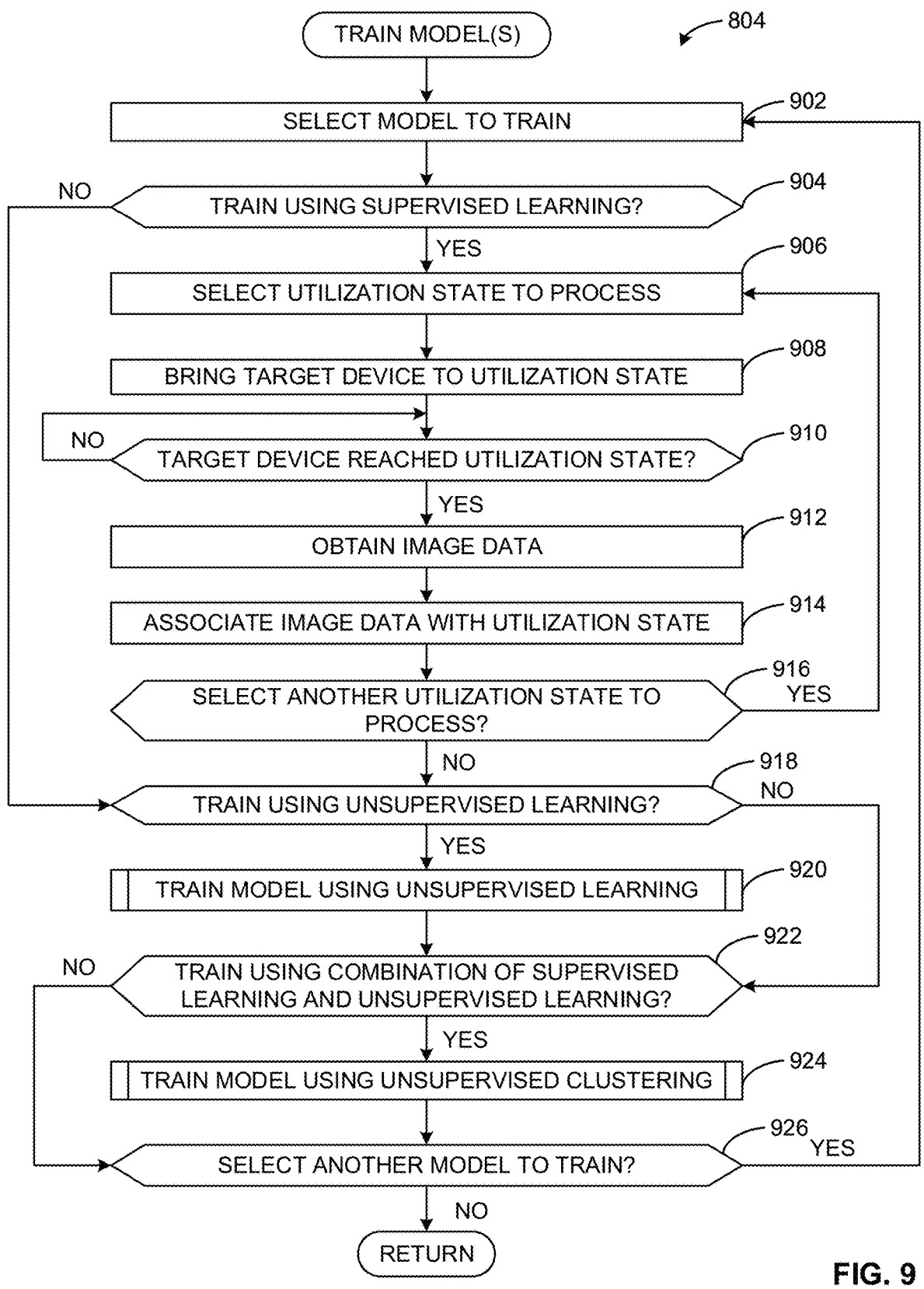
FIG. 9 is a flowchart representative of example machine readable instructions that may be executed to implement the example visual recognition system of FIGS. 1, 2, and/or 3 to train an example visual recognition model.

FIG. 9 is a flowchart representative of the machine readable instructions 804 of FIG. 8 that may be executed to implement the visual recognition systems 100, 200 of FIGS. 1, 2, and/or 3 to train the model(s). The process of FIG. 9 may be used to implement block 804 of FIG. 8. The machine readable instructions 804 of FIG. 9 begin at block 902, at which the visual recognition systems 100, 200 select a model to train. For example, the inference engine 316 (FIG. 3) may select the first model 108a of FIGS. 2-3 to train.

At block 904, the visual recognition systems 100, 200 determine whether to train using supervised learning. For example, the inference engine 316 may obtain a configuration from the configuration handler 312 (FIG. 3). In such examples, the configuration can correspond to instructions to train the models 108a-d in a supervised training mode as described above in connection with FIG. 4. If, at block 904, the visual recognition systems 100, 200 determine not to train using supervised learning, control proceeds to block 918 to determine whether to train using unsupervised learning. If, at block 904, the visual recognition systems 100, 200 determine to train using supervised learning, then, at block 906, the visual recognition systems 100, 200 select a utilization state to process. For example, the inference engine 316 may select a first utilization state of 20% utilization of the device 102 of FIGS. 1-3 to process.

At block 908, the visual recognition systems 100, 200 bring the target device to the utilization state. For example, the inference engine 316 may invoke the notification handler 310 (FIG. 3) to direct the computing platform 110 of FIGS. 1-3 to cause the device 102 to operate in the first utilization state. In such examples, the processor(s) 112 of FIGS. 1-3 can instruct the device 102 to execute one or more computation tasks to cause the device 102 to be 20% utilized.

At block 910, the visual recognition systems 100, 200 determine whether the target device has reached the utilization state. For example, the notification handler 310 may obtain a notification from the computing platform 110 that the device 102 is in the first utilization state. If, at block 910, the visual recognition systems 100, 200 determine that the target device has not reached the utilization state, control waits at block 910. If, at block 910, the visual recognition systems 100, 200 determine that the target device has reached the utilization state, then, at block 912, the visual recognition systems 100, 200 obtain image data. For example, the image acquisition system 302 (FIG. 3) may obtain an infrared still image, an infrared video frame, etc., from one or more of the cameras 106a-d of FIGS. 2-3.

At block 914, the visual recognition systems 100, 200 associate the image data with the utilization state. For example, the inference engine 316 may associate the infrared video frame of the device 102 and the first utilization state of 20% utilization. In such examples, the inference engine 316 can store the association in the models 108a-d and/or the database 306. At block 916, the visual recognition systems 100, 200 determine whether to select another utilization state to process. For example, the inference engine 316 may determine to select a second utilization state of 40% utilization to process.

If, at block 916, the visual recognition systems 100, 200 determine to select another utilization state to process, control returns to block 906 to select another utilization state to process. If, at block 916, the visual recognition systems 100, 200 determine not to select another utilization state to process, then, at block 918, the visual recognition systems 100, 200 determine whether to train using unsupervised learning. For example, the inference engine 316 may obtain a configuration from the configuration handler 312. In such examples, the configuration can correspond to instructions to train the models 108a-d in an unsupervised training mode as described above in connection with FIG. 5.

If, at block 918, the visual recognition systems 100, 200 determine not to train using unsupervised learning, control proceeds to block 922 to determine whether to train using a combination of supervised learning and unsupervised learning. If, at block 918, the visual recognition systems 100, 200 determine to train using unsupervised learning, then, at block 920, the visual recognition systems 100, 200 train the model using unsupervised learning. For example, the inference engine 316 may train the models 108a-d using unsupervised learning. An example process that may be used to implement block 920 is described below in connection with FIG. 10.

At block 922, the visual recognition systems 100, 200 determine whether to train using a combination of supervised learning and unsupervised learning. For example, the inference engine 316 may obtain a configuration from the configuration handler 312. In such examples, the configuration can correspond to instructions to train the models 108a-d in a combination mode corresponding to a combination of unsupervised learning and supervised learning, such as an unsupervised clustering mode.

If, at block 922, the visual recognition systems 100, 200 determine not to train using the combination of supervised learning and unsupervised learning, control proceeds to block 926 to determine whether to select another model to train. If, at block 922, the visual recognition systems 100, 200 determine to train using the combination of supervised learning and unsupervised learning, then, at block 924, the visual recognition systems 100, 200 train the model using unsupervised clustering. For example, the inference engine 316 may train the model using unsupervised clustering. An example process that may be used to implement block 924 is described below in connection with FIG. 11.

At block 926, the visual recognition systems 100, 200 determine whether to select another model to train. For example, the inference engine 316 may determine to train the second model 108b of FIGS. 2-3 to train. If, at block 926, the visual recognition systems 100, 200 determine to select another model to train, control returns to block 902 to select another model to train. If, at block 926, the visual recognition systems 100, 200 determine not to select another model to train, control returns to block 806 of the machine readable instructions 800 of FIG. 8 to obtain image data of the target device.

Figure 10:
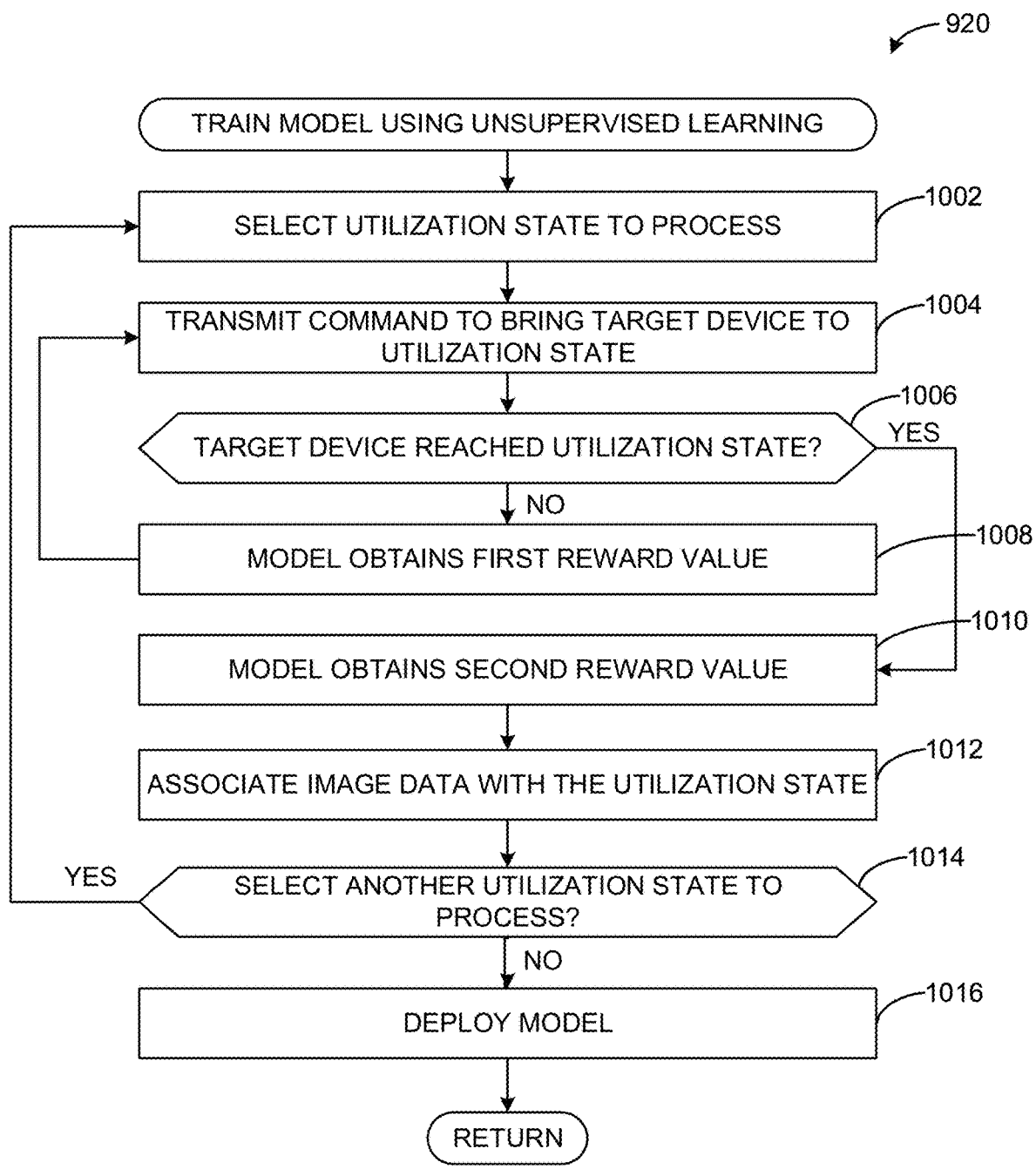
FIG. 10 is a flowchart representative of example machine readable instructions that may be executed to implement the example visual recognition system of FIGS. 1, 2, and/or 3 to train an example visual recognition model using unsupervised learning.

FIG. 10 is a flowchart representative of the machine readable instructions 920 of FIG. 9 that may be executed to implement the visual recognition systems 100, 200 of FIGS. 1, 2, and/or 3 to train the model using unsupervised learning. The process of FIG. 10 may be used to implement block 920 of FIG. 9. The machine readable instructions 920 of FIG. 10 begin at block 1002, at which the visual recognition systems 100, 200 select a utilization state to process. For example, the inference engine 316 (FIG. 3) may select a first utilization state of 20% utilization to process.

At block 1004, the visual recognition systems 100, 200 transmit a command to bring target device to utilization state. For example, the inference engine 316 may invoke the notification handler 310 (FIG. 3) to generate the command 502 of FIG. 5. In such examples, the command 502 can invoke the computing platform 110 of FIGS. 1-3 to execute the action 504 of FIG. 5 to cause the device 102 of FIGS. 1-3 to execute one or more computation tasks.

At block 1006, the visual recognition systems 100, 200 determine whether the target device has reached the utilization state. For example, the inference engine 316 may determine that the device 102 has not reached the first utilization state of 20% utilization based on obtaining one or more temperature measurements 506 from one or more of the sensors 508a-c of FIG. 5 indicative of the device 102 not reaching the first utilization state. In other examples, the inference engine 316 can determine that the device 102 has reached the first utilization state of 20% utilization based on the temperature measurements 506 from the device 102 indicative of the device 102 reaching the first utilization state.

If, at block 1006, the visual recognition systems 100, 200 determine that the target device has not reached the utilization state, then, at block 1008, the visual recognition systems 100, 200 provide a first reward value to the model. For example, the models 108a-d may obtain a first reward value indicative of the command 502 not causing a desired behavior of the device 102 (e.g., the device 102 did not enter the first utilization state in response to the command 502). In response to the model obtaining the first reward value at block 1008, control returns to block 1004 to transmit another command to bring the target device to the selected utilization state.

If, at block 1006, the visual recognition systems 100, 200 determine that the target device has reached the utilization state, control proceeds to block 1010 to provide the model with a second reward value. For example, the models 108a-d may obtain a second reward value (e.g., a reward value greater than the first reward value obtained at block 1008) indicative of the command 502 causing a desired behavior of the device 102 (e.g., the device 102 operating at the first utilization state in response to the command 502). In response to the model obtaining the second reward value at block 1010, control proceeds to block 1012 to associate image data with the utilization state. For example, the inference engine 316 may associate the infrared image 510 of FIG. 5 and the utilization state 512 based on the measurements 506. In such examples, the inference engine 316 can associate the utilization state 512 and the command 502. Accordingly, the inference engine 316 can store at least one of the associations and the infrared image 516 in the models 108a-d of FIGS. 2-3 and/or the database 306 of FIG. 3.

At block 1014, the visual recognition systems 100, 200 determine whether to select another utilization state to process. For example, the inference engine 316 may determine to select a second utilization state of 40% utilization to process. In other examples, the inference engine 316 can determine that there are no additional utilization states to process. If, at block 1014, the visual recognition systems 100, 200 determine to select another utilization state to process, control returns to block 1002 to select another utilization state to process. If, at block 1014, the visual recognition systems 100, 200 determine not to select another utilization state to process, the visual recognition systems 100, 200 deploy the mode. For example, the inference engine 316 may determine that the first model 108a is trained when the utilization states of interest have been processed. In response to deploying the model at block 1016, the machine readable instructions 920 of FIG. 10 return to block 922 of the machine readable instructions 804 of FIG. 9 to determine whether to train using a combination of supervised learning and unsupervised learning.

Figure 11:
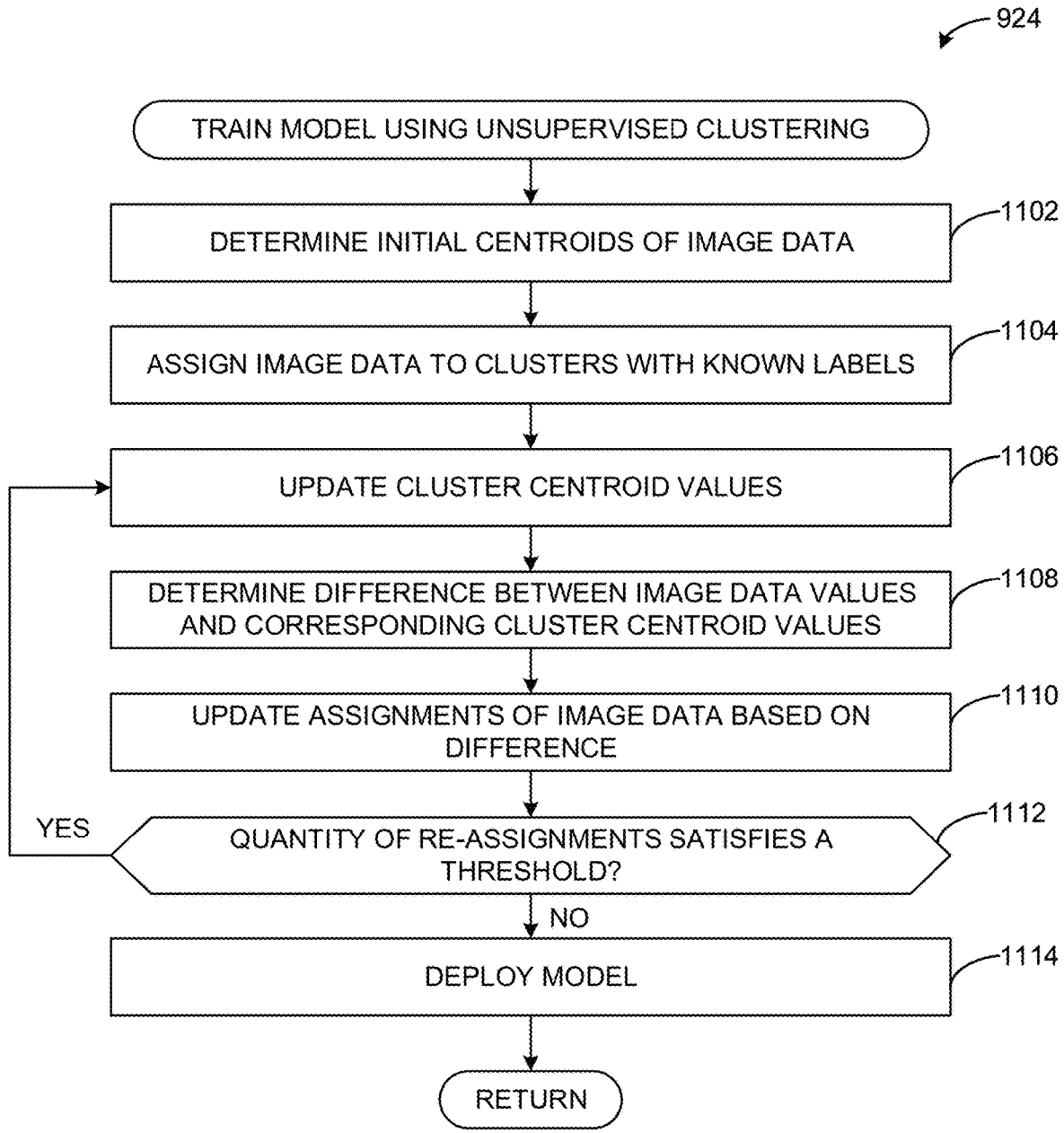
FIG. 11 is a flowchart representative of example machine readable instructions that may be executed to implement the example visual recognition system of FIGS. 1, 2, and/or 3 to train an example visual recognition model using unsupervised clustering.

FIG. 11 is a flowchart representative of the machine readable instructions 924 of FIG. 9 that may be executed to implement the visual recognition systems 100, 200 of FIGS. 1, 2, and/or 3 to train the model using unsupervised clustering. The process of FIG. 11 may be used to implement block 924 of FIG. 9. The machine readable instructions 924 of FIG. 11 begin at block 1102, at which the visual recognition systems 100, 200 determine initial centroids of image data. For example, the inference engine 316 (FIG. 3) may obtain a plurality of the infrared images 510 of FIG. 5 from the cameras 106a-d of FIG. 2 when the device 102 is operating. The inference engine 316 may determine an image value associated with each of the infrared images 510.

The image value may be determined based on an average of pixel values, a median of pixel values, etc., of the infrared image 502. The inference engine 316 can identify (e.g., randomly identify) ones of the image values as initial centroid values.

At block 1104, the visual recognition systems 100, 200 assign image data to clusters with known labels. For example, the inference engine 316 may assign each of the plurality of the infrared images 510 to a nearest one of the clusters (e.g., a first cluster, a second cluster, etc.). Each of the clusters can have a known label such as a first utilization state of 10%, a second utilization state of 20%, etc.

At block 1106, the visual recognition systems 100, 200 update the cluster centroid values. For example, the inference engine 316 may determine a cluster centroid value based on the image values associated with each of the clusters. In such examples, the inference engine 316 can determine a centroid value of a cluster based on an average of the image values in the cluster. Alternatively, the image values and/or the centroid values may be determined using any other method.

At block 1108, the visual recognition systems 100, 200 determine a difference between image data values and corresponding cluster centroid values. For example, the inference engine 316 may determine a first difference value between a first image value associated with a first one of the infrared images 510 and a first cluster centroid value. In such examples, the first difference value can be determined by calculating a sum of squared error (SSE).

At block 1110, the visual recognition systems 100, 200 update assignments of image data based on the difference. For example, the inference engine 316 may determine that the first image value associated with the first one of the infrared images 510 is closer in value to a second cluster centroid value than the first cluster centroid value. In such examples, the inference engine 316 can re-associate and/or otherwise re-assign the first image value to the cluster that includes the second cluster centroid value.

At block 1112, the visual recognition systems 100, 200 determine whether a quantity of re-assignments satisfies a threshold. For example, the inference engine 316 may determine that five image values have been re-assigned and the five re-assignments are greater than a re-assignment threshold of three re-assignments. In such examples, the inference engine 316 can determine that the five re-assignments satisfy the re-assignment threshold because the five re-assignments are greater than the re-assignment threshold of three re-assignments.

If, at block 1112, the visual recognition systems 100, 200 determine that the quantity of re-assignments satisfies the threshold, control returns to block 1106 to update the cluster centroid values. If, at block 1112, the visual recognition systems 100, 200 determine that the quantity of re-assignments do not satisfy the threshold, then, at block 1114, the visual recognition systems 100, 200 deploy the model. For example, the inference engine 316 may determine that the first model 108a is trained when the clusters have been generated. In response to deploying the model at block 1114, the machine readable instructions 924 of FIG. 11 return to block 926 of the machine readable instructions 804 of FIG. 9 to determine whether to select another model to train.

Figure 12:
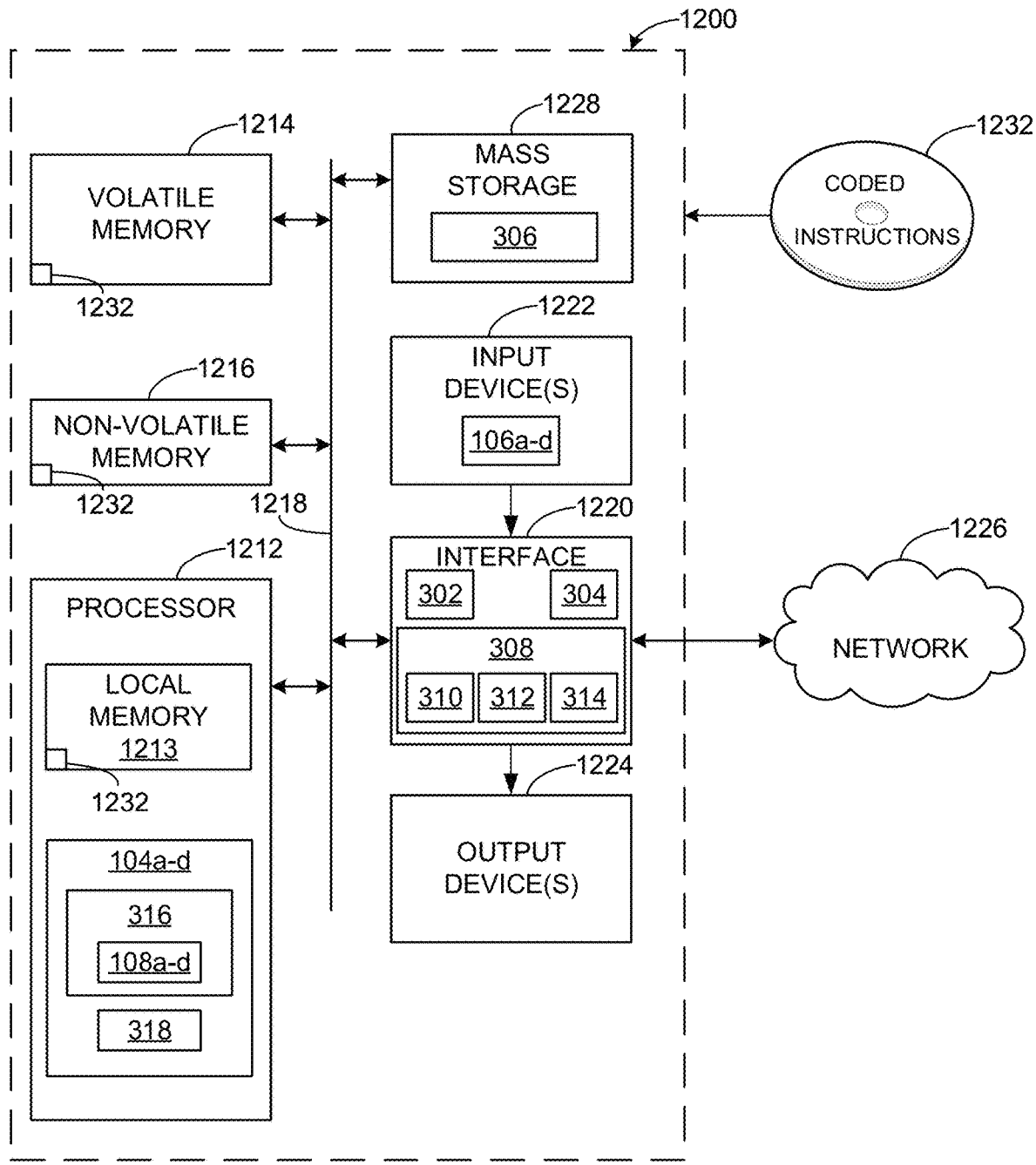
FIG. 12 is a block diagram of an example processor platform structured to execute the example machine readable instructions of FIGS. 7-11 to implement the example visual recognition system of FIGS. 1, 2, and/or 3.

FIG. 12 is a block diagram of an example processor platform 1200 structured to execute the instructions of FIGS. 7-11 to implement the visual recognition systems 100, 200 of FIGS. 1, 2, and/or 3. The processor platform 1200 can be, for example, a server, a personal computer, a workstation, a self-learning machine (e.g., a neural network), or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1212 implements the visual recognition controllers 104a-d, the models 108a-d, the inference engine 316, and the task handler 318 of FIGS. 2-3. Alternatively, the processor 1212 may implement the visual recognition controller 104 and the model 108 of FIG. 1.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface. In this example, the interface circuit 1220 implements the example image acquisition system 302, the example data bus 304, the example data interface 308, the example notification handler 310, the example configuration handler 312, and the example data handler 314 of FIG. 3. Alternatively, the processor 1212 may implement the example notification handler 310, the example configuration handler 312, and the example data handler 314 of FIG. 3.

In the illustrated example, one or more input devices 1222 are connected to the interface circuit 1220. The input device(s) 1222 permit(s) a user to enter data and/or commands into the processor 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system. In this example, the one or more input devices 1222 implement the cameras 106a-d of FIGS. 2-3. Alternatively, the one or more input devices 1222 may implement the camera 106 of FIG. 1.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1220 of the illustrated example, thus, typically includes a graphics driver card, a graphics driver chip, and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives. In this example, the one or more mass storage devices 1228 implements the database 306 of FIG. 3.

The machine executable instructions 1232 of FIGS. 7-11 may be stored in the mass storage device 1228, in the volatile memory 1214, in the non-volatile memory 1216, and/or on a removable non-transitory computer readable storage medium such as a CD or DVD.

From the foregoing, it will be appreciated that example systems, methods, apparatus, and articles of manufacture have been disclosed that improve computing utilization. The disclosed systems, methods, apparatus, and articles of manufacture improve the efficiency of using a computing device by classifying a utilization state of a device, determining whether a quantity of computation tasks assigned to the device can be adjusted, and adjusting the quantity of computation tasks based on the determination. The example systems, methods, apparatus, and articles of manufacture have been disclosed that do not affect the performance of the device because of independence from the device. The example systems, methods, apparatus, and articles of manufacture disclosed herein are flexible as training of machine-learning models can be on a per target hardware, a portion of the target hardware, etc., basis. The disclosed systems, methods, apparatus, and articles of manufacture are accordingly directed to one or more improvement(s) in the functioning of a computer.

Example methods, apparatus, systems, and articles of manufacture to improve computing system utilization are disclosed herein. Further examples and combinations thereof include the following:

Example 1 includes a system to identify a utilization state of a device, the system comprising a visual recognition controller to determine whether an infrared image of the device corresponds to a first utilization state of the device based on a machine-learning model, and generate a report including the first utilization state, and at least one processor to execute one or more actions to adjust operation of the device from the first utilization state to a second utilization state based on the report obtained from the visual recognition controller, the second utilization state corresponding to reduced utilization compared to the first utilization state.

Example 2 includes the system of example 1, further including an infrared camera to capture the infrared image.

Example 3 includes the system of example 1, wherein the at least one processor is to obtain at least one of a data log or first infrared images of the device from the visual recognition controller, the data log including one or more utilization states including the first utilization state, the first infrared images including the infrared image.

Example 4 includes the system of example 3, wherein the one or more utilization states correspond to a utilization percentage of a portion of the device.

Example 5 includes the system of example 1, wherein the machine-learning model is generated by the visual recognition controller using supervised learning by inducing the device to operate in the first utilization state, obtaining a first infrared image of the device when operating in the first utilization state, associating the first utilization state with a utilization state label, associating the first utilization state with a set of actions including generating the report based on the utilization state label, and storing the first infrared image and the associations in a database.

Example 6 includes the system of example 1, wherein the machine-learning model is generated by the visual recognition controller using unsupervised learning by transmitting a first command to the at least one processor to induce the device to operate in a third utilization state, obtaining a first infrared image of the device when the device is operating based on the transmitted command, obtaining a measurement from a temperature sensor monitoring the device when the device is operating based on the transmitted command, obtaining a reward value when the measurement indicates the device is operating in the third utilization state, associating the third utilization state and the first infrared image, and storing the first infrared image and the association in a database.

Example 7 includes the system of example 1, wherein the device is a first device, and the at least one processor is to adjust the operation of the device to the second utilization state by at least one of adjusting operation of a cooling system, redirecting a computing load from the first device to a second device, or turning off the first device.

Example 8 includes a system to identify a utilization state of a device, the system comprising at least one processor, and memory including instructions that, when executed, cause the at least one processor to determine whether an infrared image of the device corresponds to a first utilization state of the device based on a machine-learning model, generate a report including the first utilization state, and execute one or more actions to adjust operation of the device from the first utilization state to a second utilization state based on the report, the second utilization state corresponding to reduced utilization compared to the first utilization state.

Example 9 includes the system of example 8, further including an infrared camera to capture the infrared image, and wherein the instructions, when executed, cause the at least one processor to obtain the infrared image from the infrared camera.

Example 10 includes the system of example 8, wherein the instructions, when executed, cause the at least one processor to obtain at least one of a data log or first infrared images of the device from a database, the data log including one or more utilization states including the first utilization state, the first infrared images including the infrared image.

Example 11 includes the system of example 10, wherein the one or more utilization states correspond to a utilization percentage of a portion of the device.

Example 12 includes the system of example 8, wherein the instructions, when executed, cause the at least one processor to generate the machine-learning model using supervised learning by inducing the device to operate in the first utilization state, obtaining a first infrared image of the device when operating in the first utilization state, associating the first utilization state with a utilization state label, associating the first utilization state with a set of actions including generating the report based on the utilization state label, and storing the first infrared image and the associations in a database.

Example 13 includes the system of example 8, wherein the instructions, when executed, cause the at least one processor to generate the machine-learning model using unsupervised learning by generating a command to induce the device to operate in a third utilization state, obtaining a first infrared image of the device when the device is operating based on the command, obtaining a measurement from a temperature sensor monitoring the device when the device is operating based on the command, obtaining a reward value when the measurement indicates the device is operating in the third utilization state, associating the third utilization state and the first infrared image, and storing the first infrared image and the association in a database.

Example 14 includes the system of example 8, wherein the device is a first device, and wherein the instructions, when executed, cause the at least one processor to adjust the operation of the device to the second utilization state by at least one of adjusting operation of a cooling system, redirecting a computing load from the first device to a second device, or turning off the first device.

Example 15 includes a non-transitory computer readable storage medium comprising instructions that, when executed, cause at least one processor to at least determine whether an infrared image of a device corresponds to a first utilization state of the device based on a machine-learning model, generate a report including the first utilization state, and execute one or more actions to adjust operation of the device from the first utilization state to a second utilization state based on the report, the second utilization state corresponding to reduced utilization compared to the first utilization state.

Example 16 includes the non-transitory computer readable storage medium of example 15, wherein the instructions, when executed, cause the at least one processor to obtain the infrared image from an infrared camera.

Example 17 includes the non-transitory computer readable storage medium of example 15, wherein the instructions, when executed, cause the at least one processor to obtain at least one of a data log or first infrared images of the device from a database, the data log including one or more utilization states including the first utilization state, the first infrared images including the infrared image.

Example 18 includes the non-transitory computer readable storage medium of example 17, wherein the one or more utilization states correspond to a utilization percentage of a portion of the device.

Example 19 includes the non-transitory computer readable storage medium of example 15, wherein the instructions, when executed, cause the at least one processor to generate the machine-learning model using supervised learning by inducing the device to operate in the first utilization state, obtaining a first infrared image of the device when operating in the first utilization state, associating the first utilization state with a utilization state label, associating the first utilization state with a set of actions including generating the report based on the utilization state label, and storing the first infrared image and the associations in a database.

Example 20 includes the non-transitory computer readable storage medium of example 15, wherein the instructions, when executed, cause the at least one processor to generate the machine-learning model using unsupervised learning by generating a command to induce the device to operate in a third utilization state, obtaining a first infrared image of the device when the device is operating based on the command, obtaining a measurement from a temperature sensor monitoring the device when the device is operating based on the command, obtaining a reward value when the measurement indicates the device is operating in the third utilization state, associating the third utilization state and the first infrared image, and storing the first infrared image and the association in a database.

Example 21 includes the non-transitory computer readable storage medium of example 15, wherein the device is a first device, and the instructions, when executed, cause the at least one processor to adjust the operation of the device to the second utilization state by at least one of adjusting operation of a cooling system, redirecting a computing load from the first device to a second device, or turning off the first device.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A system to identify a utilization state of a device, the system comprising:
    a visual recognition controller to:
        develop a machine-learning model based on a first infrared image of the device in a first utilization state, the machine-learning model indicative of an association between the first utilization state of the device and a set of actions;
        determine whether a second infrared image of the device corresponds to the first utilization state based on the machine-learning model; and
        generate a report to identify the first utilization state; and
    at least one processor to execute one or more of the set of actions to adjust operation of the device from the first utilization state to a second utilization state based on the report, the second utilization state corresponding to reduced utilization compared to the first utilization state.

2. The system of claim 1, further including an infrared camera to capture at least one of the first infrared image or the second infrared image.

3. The system of claim 1, wherein the at least one processor is to obtain at least one of a data log or a first set of infrared images of the device from the visual recognition controller, the data log to identify one or more utilization states including the first utilization state, the first set of infrared images including at least one of the first infrared image or the second infrared image.

4. The system of claim 3, wherein the one or more utilization states correspond to a utilization percentage of a portion of the device.

5. The system of claim 1, wherein the device is a first device, and the at least one processor is to adjust the operation of the first device to the second utilization state by at least one of adjusting operation of a cooling system, redirecting a computing load from the first device to a second device, or turning off the first device.

6. A system to identify a utilization state of a device, the system comprising:
    at least one processor; and
    a visual recognition controller to:
        determine that the device is in a first utilization state based on a measurement from a temperature sensor monitoring the device, the first utilization state to occur in response to a command from the at least one processor;
        generate a machine-learning model based on an association of a reward value, the first utilization state, and a first infrared image of the device in the first utilization state, the reward value corresponding to the device in the first utilization state, the association reflected in a database;
determine whether a second infrared image of the device corresponds to the first utilization state based on the machine-learning model; and
generate a report, the report to identify the first utilization state; and
the at least one processor to execute one or more actions to adjust the device from the first utilization state to a second utilization state based on the report, the second utilization state corresponding to reduced utilization compared to the first utilization state.

7. The system of claim 6, wherein the device is a first device, and the at least one processor is to adjust the operation of the first device to the second utilization state by at least one of adjusting operation of a cooling system, redirecting a computing load from the first device to a second device, or turning off the first device.

8. A system to identify a utilization state of a device, the system comprising:
memory; and
at least one processor to execute instructions to:
develop a machine-learning model based on a first infrared image of the device in a first utilization state, the machine-learning model indicative of an association between the first utilization state of the device and a set of actions;
determine whether a second infrared image of the device corresponds to the first utilization state of the device based on the machine-learning model;
generate a report to identify the first utilization state; and
execute one or more of the set of actions to adjust operation of the device from the first utilization state to a second utilization state based on the report, the second utilization state corresponding to reduced utilization compared to the first utilization state.

9. The system of claim 8, further including an infrared camera to capture at least one of the first infrared image or the second infrared image, and the at least one processor to obtain the at least one of the first infrared image or the second infrared image from the infrared camera.

10. The system of claim 8, wherein the at least one processor is to obtain at least one of a data log or a first set of infrared images of the device from a database, the data log to identify one or more utilization states including the first utilization state, the first set of infrared images including at least one of the first infrared image or the second infrared image.

11. The system of claim 10, wherein the one or more utilization states correspond to a utilization percentage of a portion of the device.

12. The system of claim 8, wherein the device is a first device, and the at least one processor is to adjust the operation of the first device to the second utilization state by at least one of adjusting operation of a cooling system, redirecting a computing load from the first device to a second device, or turning off the first device.

13. A system to identify a utilization state of a device, the system comprising:
memory; and
at least one processor to execute instructions to:
determine that the device is in a first utilization state based on a measurement from a temperature sensor monitoring the device, the first utilization state to occur in response to a command from the at least one processor;
generate a machine-learning model based on an association of a reward value, the first utilization state, and a first infrared image of the device in the first utilization state, the reward value corresponding to the device in the first utilization state, the association identified in a database;
determine whether a second infrared image of the device corresponds to the first utilization state of the device based on the machine-learning model;
generate a report, the report to identify the first utilization state; and
execute one or more actions to adjust the device from the first utilization state to a second utilization state based on the report, the second utilization state corresponding to reduced utilization compared to the first utilization state.

14. The system of claim 13, wherein the device is a first device, and the at least one processor to adjust the operation of the first device to the second utilization state by at least one of adjusting operation of a cooling system, redirecting a computing load from the first device to a second device, or turning off the first device.

15. A non-transitory computer readable storage medium comprising instructions that, when executed, cause at least one processor to at least:
develop a machine-learning model based on a first infrared image of a device in a first utilization state, the machine-learning model indicative of an association between the first utilization state of the device and a set of actions;
determine whether a second infrared image of the device corresponds to the first utilization state based on the machine-learning model;
generate a report to identify the first utilization state; and
execute one or more of the set of actions to adjust operation of the device from the first utilization state to a second utilization state based on the report, the second utilization state corresponding to reduced utilization compared to the first utilization state.

16. The non-transitory computer readable storage medium of claim 15, wherein the instructions, when executed, cause the at least one processor to obtain at least one of the first infrared image or the second infrared image from an infrared camera.

17. The non-transitory computer readable storage medium of claim 15, wherein the instructions, when executed, cause the at least one processor to obtain at least one of a data log or a plurality of infrared images of the device from a database, the data log to identify one or more utilization states including the first utilization state, the plurality of infrared images including at least one of the first infrared image or the second infrared image.

18. The non-transitory computer readable storage medium of claim 17, wherein the one or more utilization states correspond to a utilization percentage of a portion of the device.

19. The non-transitory computer readable storage medium of claim 15, wherein the device is a first device, and the instructions, when executed, cause the at least one processor to adjust the operation of the first device to the second utilization state by at least one of adjusting operation of a cooling system, redirecting a computing load from the first device to a second device, or turning off the first device.

20. A non-transitory computer readable storage medium comprising instructions that, when executed, cause at least one processor to at least:
- determine that a device is in a first utilization state based on a measurement from a temperature sensor monitoring the device, the device to enter the first utilization state in response to a command from the at least one processor;
- generate a machine-learning model based on an association of a reward value, the first utilization state, and a first infrared image of the device in the first utilization state, the reward value corresponding to the device in the first utilization state, the association identified in a database;
- determine whether a second infrared image of the device corresponds to the first utilization state of the device based on the machine-learning model;
- generate a report, the report to identify the first utilization state; and
- execute one or more actions to adjust the device from the first utilization state to a second utilization state based on the report, the second utilization state corresponding to reduced utilization compared to the first utilization state.

21. The non-transitory computer readable storage medium of claim 20, wherein the device is a first device, and the instructions, when executed, cause the at least one processor to adjust the operation of the first device to the second utilization state by at least one of adjusting operation of a cooling system, redirecting a computing load from the first device to a second device, or turning off the first device.

* * * * *